United States Patent
Kobayashi et al.

(10) Patent No.: US 8,144,176 B2
(45) Date of Patent: Mar. 27, 2012

(54) EXPOSURE APPARATUS, METHOD FOR CORRECTING EMISSION QUANTITY OF EXPOSURE APPARATUS, AND IMAGE FORMING APPARATUS

(75) Inventors: Kenji Kobayashi, Hino (JP); Yoshiyuki Matsuoka, Tokorozawa (JP); Isao Ebisawa, Hamura (JP)

(73) Assignee: Casio Computer Co., Ltd., Tokyo (JP)

( * ) Notice: Subject to any disclaimer, the term of this patent is extended or adjusted under 35 U.S.C. 154(b) by 169 days.

(21) Appl. No.: 12/749,990

(22) Filed: Mar. 30, 2010

(65) Prior Publication Data

US 2010/0245528 A1    Sep. 30, 2010

(30) Foreign Application Priority Data

Mar. 31, 2009    (JP) .................... 2009-088414

(51) Int. Cl.
   *B41J 2/435*    (2006.01)
(52) U.S. Cl. ........................ 347/236; 347/246
(58) Field of Classification Search .............. 347/236, 347/237, 246, 247
   See application file for complete search history.

(56) References Cited

U.S. PATENT DOCUMENTS

| | | | |
|---|---|---|---|
| 4,855,760 A * | 8/1989 | Kanayama | 347/240 |
| 5,640,190 A * | 6/1997 | Bollansee et al. | 347/240 |
| 6,104,509 A * | 8/2000 | Yoshida | 358/509 |
| 6,828,538 B2 * | 12/2004 | Maeda | 250/205 |
| 6,982,813 B2 * | 1/2006 | Hirata et al. | 358/1.9 |
| 2005/0263718 A1 * | 12/2005 | Tsujino et al. | 250/483.1 |

FOREIGN PATENT DOCUMENTS

JP    2002-144634 A    5/2002

* cited by examiner

*Primary Examiner* — Hai C Pham

(74) *Attorney, Agent, or Firm* — Holtz, Holtz, Goodman & Chick, PC

(57) ABSTRACT

An exposure apparatus has a plurality of light emitting elements and a light quantity measuring circuit, sets a reference light quantity based on a plurality of emission quantities when the plurality of light emitting elements emit light in accordance with a specific gradation signal for a predetermined emission time, generates a plurality of corrected gradation signals by correcting the gradation signal based on the differences between the reference light quantity and the plurality of emission quantities so that the plurality of emission quantities of the plurality of light emitting elements become close to the reference light quantity, and corrects the emission time of the plurality of light emitting elements so that the plurality of emission quantities of the plurality of light emitting elements become close to the target reference light quantity set in accordance with image data.

18 Claims, 17 Drawing Sheets

| | FIG. 14A | FIG. 14B | FIG. 14C | FIG. 14D |
|---|---|---|---|---|
| Select(1) | HIGH | HIGH | LOW | LOW |
| Anode(1) | LOW | HIGH | HIGH | LOW |
| Reset | HIGH | LOW | LOW | LOW |
| Vdata(1) | — | V1(1) | — | — |

EXPOSURE APPARATUS, METHOD FOR CORRECTING EMISSION QUANTITY OF EXPOSURE APPARATUS, AND IMAGE FORMING APPARATUS

CROSS-REFERENCE TO RELATED APPLICATION

This application claims the benefit of Japanese Patent Application 2009-88414, filed Mar. 31, 2009, the entire disclosure of which is incorporated by reference herein.

FIELD

This application relates generally to an exposure apparatus and method for correcting the emission quantity of an exposure apparatus and an image forming apparatus comprising the same.

BACKGROUND

Conventionally, some exposure units (exposure heads) of image forming apparatuses (printers, electrophotographic devices, etc) employing the electrophotographic process comprise organic EL elements as light emitting elements serving as the light source.

Recently, intensive efforts have been made to develop plane emission devices using organic EL elements. By using organic EL elements in place of LEDs as the light source in electrophotographic process, the number of wire bonding connections to LEDs can be reduced, which will significantly contribute to reduced cost.

However, under the present circumstances, organic EL elements are subject to notable reduction in light quantity due to deterioration with time compared to LEDs and, accordingly, uneven luminance tends to occur. For this reason, when organic EL elements are used in the exposure unit of an image forming apparatus, uneven print density tends to occur due to deterioration with time.

Then, a light reception element is provided along with each organic EL element. The light reception element monitors the light from the organic EL element. Drive signals are controlled so that each organic EL element has an emission luminance of a predetermined value, thereby correcting any reduction in light quantity due to deterioration with time and preventing uneven luminance, which consequently prevents uneven print density of an image forming apparatus in which the exposure unit comprises organic EL elements. Such a structure is disclosed, for example, in Unexamined Japanese Patent Application KOKAI Publication No. 2002-144634.

Organic EL elements tend to be subject to deterioration with time, namely the emission luminance drops with time when a constant voltage is applied. Therefore, in the structure as disclosed in Unexamined Japanese Patent Application KOKAI Publication No. 2002-144634, the voltage value of the drive voltage applied to the organic EL elements is progressively increased to maintain the emission luminance of the organic EL elements at a fixed value regardless of deterioration with time.

However, the deterioration with time of organic EL elements is accelerated as the voltage value of the applied voltage is increased. Therefore, when only the voltage value of the drive voltage is controlled as in the above case, the deterioration with time of organic EL elements is accelerated. Consequently, the organic EL elements will have a short life.

SUMMARY

The present invention advantageously provides an exposure apparatus and exposure apparatus emission quantity correction method capable of reducing uneven luminance and density while delaying the deterioration with time of organic EL elements, and an image forming apparatus comprising the same.

The exposure apparatus according to the present invention in order to obtain the above advantage is an exposure apparatus irradiating a photoconductor drum with light for exposure, comprising: a plurality of light emitting elements which emit light for exposing the photoconductor drum according to image data; a light quantity measuring circuit which measures a plurality of emission quantities each of which is based on emission intensity and emission time of one of the plurality of light emitting elements; a difference acquisition circuit which acquires a plurality of first differences and a second difference, wherein the difference acquisition circuit set a reference light quantity based on the plurality of emission quantities when the plurality of light emitting elements are supplied with an original gradation signal having specific values corresponding to the image data and emit light for a predetermined emission time, each of the plurality of first differences is difference between the reference light quantity and each emission quantity, and the second difference is a difference between a target reference light quantity set corresponding to the image data and the reference light quantity; a gradation signal correction circuit generating a plurality of corrected gradation signals by correcting the original gradation signal based on the plurality of first differences so that the plurality of emission quantities of the plurality of light emitting elements in the emission time become close to the reference light quantity; and an emission time correction circuit correcting the emission time based on the second difference so that the plurality of emission quantities of the plurality of light emitting elements corresponding to the plurality of corrected gradation signals become close to the target reference light quantity.

The image forming apparatus according to the present invention in order to obtain the above advantage is an image forming apparatus for making prints according to image data, comprising: a photoconductor drum that is charged; a plurality of light emitting elements which emit light for exposing the photoconductor drum according to the image data; a light quantity measuring circuit which measures a plurality of emission quantities each of which is based on emission intensity and emission time of one of the plurality of light emitting element; a difference acquisition circuit which acquires a plurality of first difference and a second difference, wherein the difference acquisition circuit set a reference light quantity based on the plurality of emission quantities when the plurality of light emitting elements are supplied with an original gradation signal having specific values corresponding to the image data and emit light for a predetermined emission time, each of the plurality of first differences is a difference between the reference light quantity and each emission quantity, and the second difference is a difference between a target reference light quantity set corresponding to the image data and the reference light quantity; a gradation signal correction circuit generating a plurality of corrected gradation signals by correcting the original gradation signal based on the plurality of first differences so that the emission quantity of the plurality of light emitting elements in the emission time become close to the reference light quantity; and an emission time correction circuit correcting the emission time based on the second difference so that the plurality of emission quantities of the plurality of light emitting elements corresponding to the plurality of corrected gradation signals become close to the target reference light quantity.

The method of correcting the emission quantity of an exposure apparatus comprising a plurality of light emitting elements and irradiating a photoconductor drum with light for exposure, comprising the following steps: measuring a plurality of emission quantities each of which is based on emission intensity and emission time of one of the plurality of light emitting elements when an original gradation signal having specific values corresponding to image data is applied to each of the plurality of light emitting elements; setting a reference light quantity based on the plurality of measured emission quantities; acquiring a plurality of first differences each of which is a difference between the set reference light quantity and each emission quantity; generating a plurality of corrected gradation signals by correcting the original gradation signal based on the plurality of first differences so that the plurality of emission quantities of the plurality of light emitting elements in the emission time become close to the reference light quantity; and setting a target reference light quantity corresponding to the image data and acquiring a second difference that is the difference between the target reference light quantity and the reference light quantity; and correcting the emission time based on the second difference so that the plurality of emission quantities of the plurality of light emitting elements corresponding to the plurality of corrected gradation signals become close to the target reference light quantity.

BRIEF DESCRIPTION OF THE DRAWINGS

A more complete understanding of this application can be obtained when the following detailed description is considered in conjunction with the following drawings, in which.

DETAILED DESCRIPTION

The image forming apparatus according to an embodiment of the present invention will be described in detail hereafter with reference to the drawings.

Figure 1:
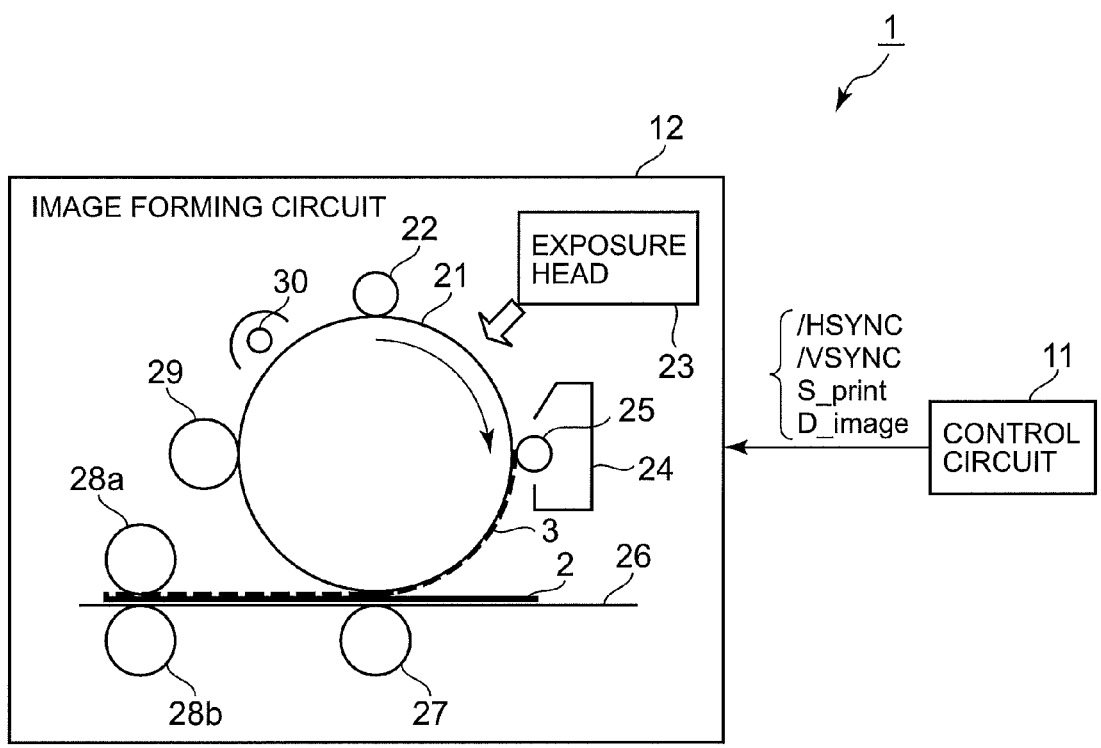
FIG. 1 is a block diagram showing the structure of an image forming apparatus according to an embodiment of the present invention.

FIG. 1 shows the structure of an image forming apparatus according to this embodiment.

As shown in FIG. 1, an image forming apparatus 1 according to this embodiment comprises a control circuit 11 and an image forming circuit 12.

The control circuit 11 controls the image forming circuit 12. The control circuit 11 comprises, for example, a raster image processor circuit and temporarily stores image data D_image supplied from an external source.

Supplied with data such as a paper size, the control circuit 11 generates a horizontal control signal /HSYNC, a vertical control signal /VSYNC, and a printer control signal S_print in time with the conveying speed. The horizontal control signal /HSYNC is the synchronization signal for the main scan direction of the image forming apparatus 1.

The control circuit 11 supplies the image date D_image to the image forming circuit 12. The control circuit 11 also supplies the generated control signals to the image forming circuit 12, thereby controlling the image forming circuit 12.

The image forming circuit 12 is used to print characters and graphics on a paper 2 based on the control signals supplied from the control circuit 11.

The image forming circuit 12 comprises a photoconductor drum 21, a charging roller 22, an exposure head 23, a developer 24, a developing roller 25, a conveyer belt 26, a transfer roller 27, fixing rollers 28a and 28b, a cleaner 29, and an eraser light source 30.

The photoconductor drum 21 is a drum charged for forming an electrostatic latent image. The photoconductor drum 21 is driven by a drive circuit (not shown) and rotates about the axis in the arrowed direction. The photoconductor drum 21 is formed by a negatively charged OPC (organic photoconductor).

The charging roller 22 uniformly charges the photoconductor drum 21. The charging roller 22 is a negative charger. When a negative voltage is applied by a charging power source (not shown), the charging roller 22 negatively charges the peripheral surface of the photoconductor drum 21 uniformly to a voltage Vcharge that is relatively close to or equal to the developing voltage output from the developer 24.

The exposure head 23 conducts optical writing (exposure) on the charged photoconductor drum 21 based on the control signals supplied from the control circuit 11.

The exposure head 23 conducts optical writing on the photoconductor drum 21 to form an electrostatic latent image of a potential Velec up to −50 V (Velec>Vcharge) on the photoconductor drum 21.

Figure 2:
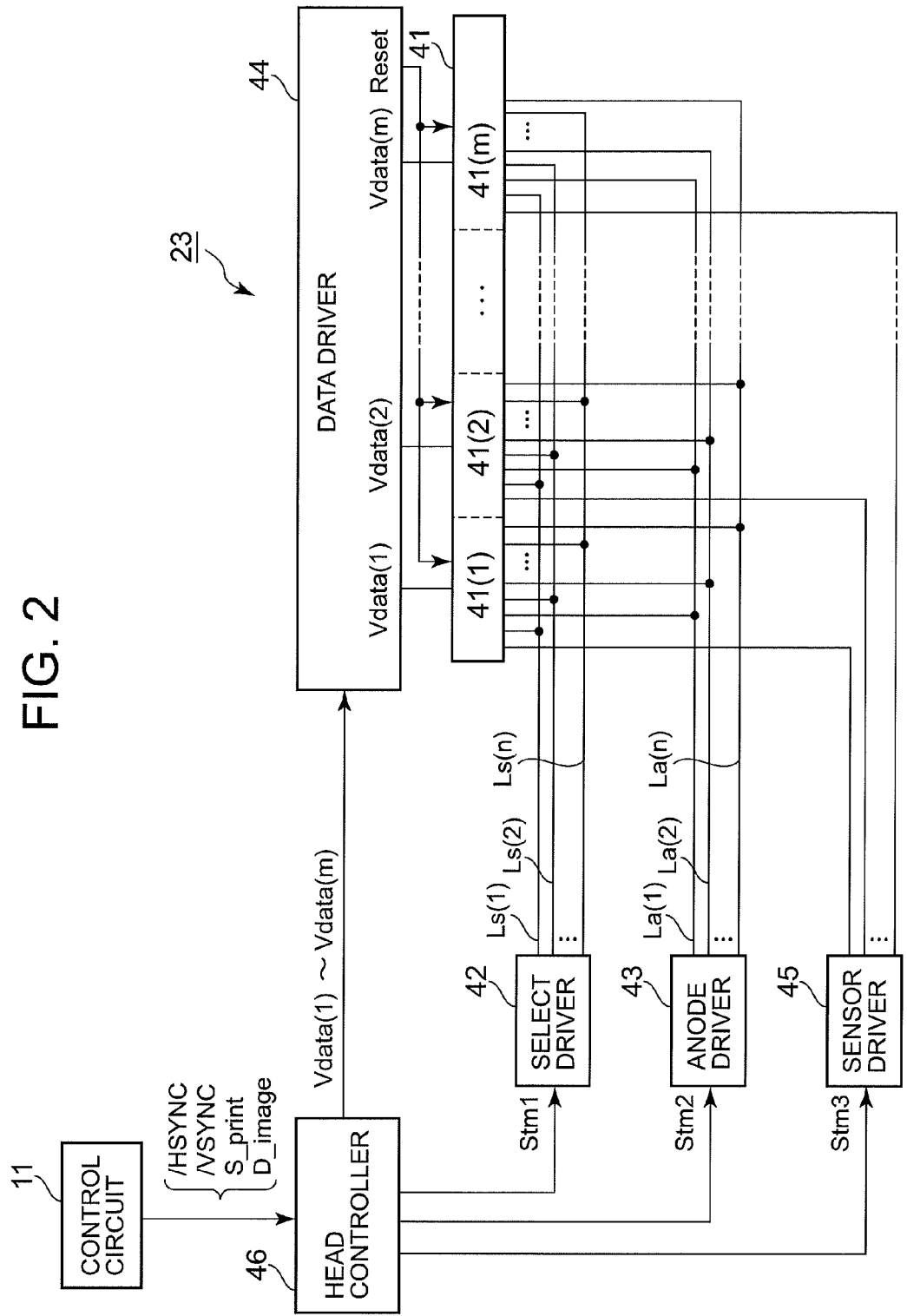
FIG. 2 is an illustration showing the structure of the exposure head shown in FIG. 1.

The exposure head 23 comprises, as shown in FIG. 2, an organic EL panel 41, a selector driver 42, an anode driver 43, a data driver 44, a sensor driver 45, and a head controller 46.

The organic EL panel 41 comprises multiple organic EL elements as light emitting elements and consists of multiple cells 41 (1) to 41 (m).

Figure 3:
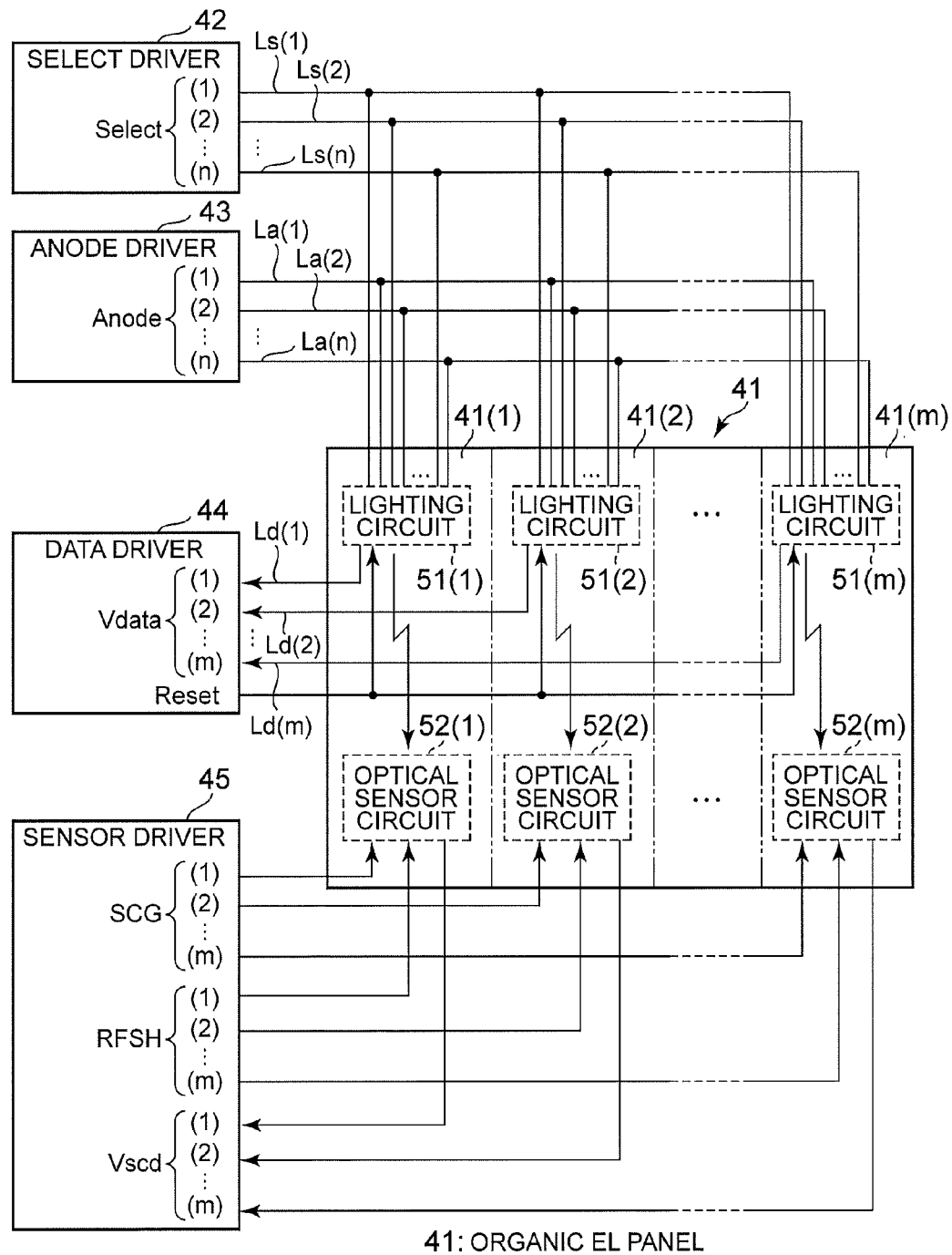
FIG. 3 is an illustration showing the detailed structure of the exposure head shown in FIG. 2.

The cells 41 (i) (i=1 to m) each comprise, as shown in FIG. 3, a lighting circuit 51 (i) and an optical sensor circuit 52 (i).

Figure 4:
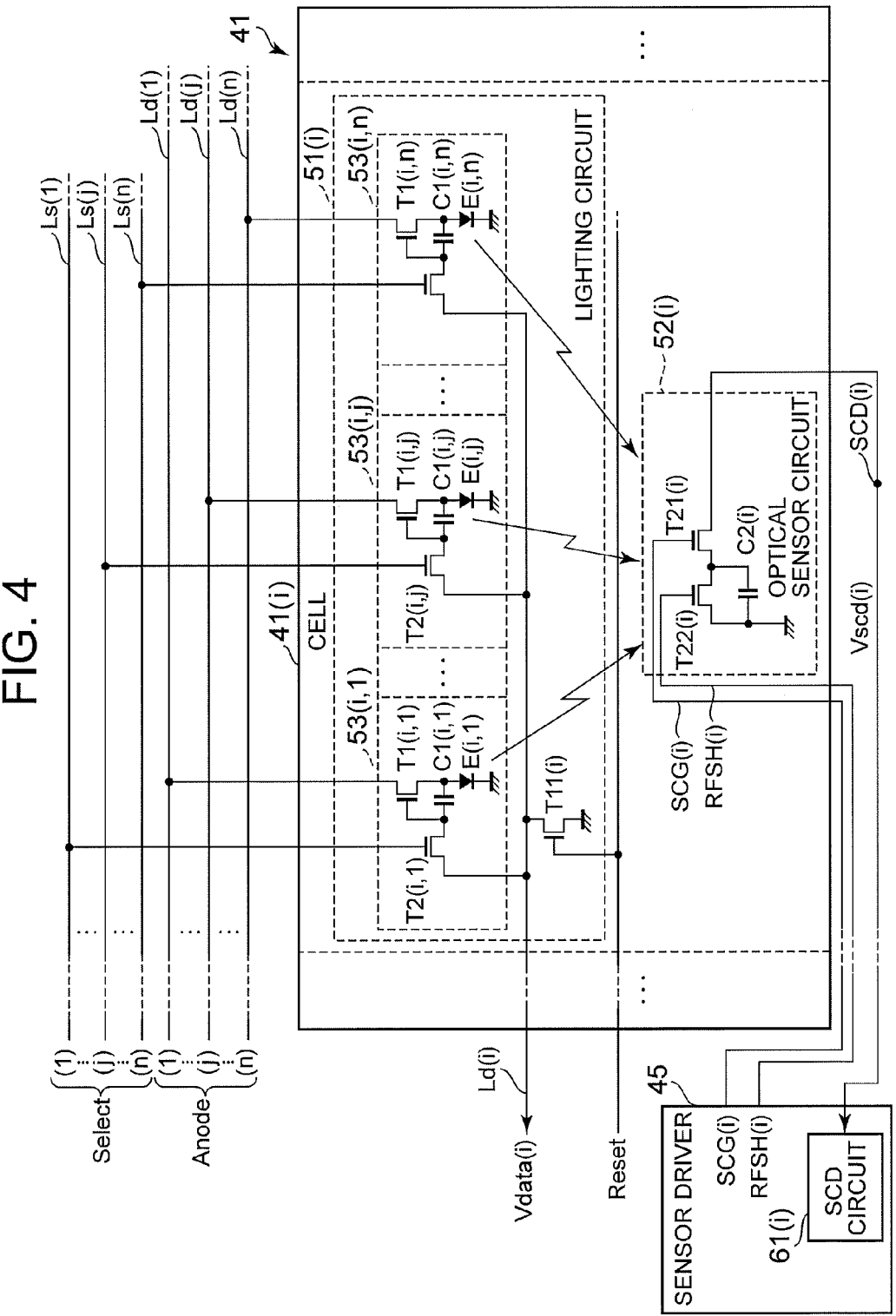
FIG. 4 is an illustration showing the detailed structure of a cell shown in FIG. 3.

The lighting circuit 51 (i) comprises, as shown in FIG. 4, n pixels 53 (i, j) (j=1 to n; n is a natural number) and a transistor T11 (i).

The pixels 53 (i, j) each comprise an organic EL element E (i, j), transistors T1 (i, j) and T2 (i, j), and a capacitor C1 (i, j). Here, multiple organic EL elements E (i, 1) to E (i, n) in each cell 41 (i) (i=1 to m) correspond to a group of organic EL elements in the present invention.

The transistors T11 (i), T1 (i, j), and T2 (i, j) are each, for example, a thin film transistor (TFT) formed by an n-channel FET (field effect transistor).

The organic EL elements E (i, j) are each a light emitting element having a laminated structure including a pixel electrode, an organic EL layer consisting of multiple carrier transport layers, and a counter electrode. The counter electrode (cathode electrode) is set, for example, to the ground potential.

The transistors T1 (i, j) are each a transistor for driving the organic EL element E (i, j). The drain of the transistor T1 (i, j) is connected to an anode line La (j) and the source is connected to the anode electrode of the organic EL element E (i, j).

The transistors T2 (i, j) are each a transistor serving as a switch for selecting the organic EL element E (i, j). The drain of the transistor T2 (i, j) is connected to a data line Ld (i), the source is connected to the gate of the transistor T1 (i, j), and the gate is connected to an select line Ls (j).

The capacitors C1 (i, j) are each a retention capacity for retaining the voltage between the gate and source of the transistor T1 (i, j). The capacitor C1 (i, j) is connected between the gate and source of the transistor T1 (i, j).

The transistors T11 (i) are each a transistor for resetting the level of the data line Ld (i). The drain of the transistor T11 (i) is connected to the data line Ld (i) and the source is set to the ground potential.

The transistor T11 (i) is turned on when a high level reset signal Reset is supplied to its gate. Then, the voltage level of the data line Ld (i) is reset.

The optical sensor circuits 52 (i) are each a circuit measuring the emission quantity of the organic EL element E (i, j) to be measured. The emission quantity is expressed as the product of the emission intensity per unit area and emission time of the organic EL element E (i, j).

The optical sensor circuits 52 (i) correspond to the cells 41 (i), respectively. The optical sensor circuit 52 (i) outputs to a node SCD (i) a signal of a potential Vscd (i) corresponding the emission quantity of the organic EL element E (i, j) to be measured.

The optical sensor circuit 52 (i) is constituted by transistors T21 (i) and T22 (i) and a capacitor C2 (i). The optical sensor circuits 52 (i) are formed, for example, in the same process as the pixels 53 (i, j).

The transistor T22 (i) is a transistor for detecting light. The drain of the transistor T22 (i) is connected to the source of the transistor T21 (i) and the source is set to the ground potential. The transistor T22 (i) is supplied with a refresh signal RFSH (i) at the gate. The transistor T22 (i) is turned on when a high level refresh signal RFSH (i) higher than a threshold voltage is supplied.

The transistor T22 (i) is turned off when the refresh signal RFSH (i) becomes at a low level. Irradiated with light, the transistor T22 (i) has a channel created between the drain and source, allowing a drain current in a current amount corresponding to the emission quantity of the organic EL elements E (i, j) of the pixels 53 (i, 1) to 53 (i, n) to run.

The transistor T21 (i) is a charging TFT. The source of the transistor T21 (i) is connected to the drain of the transistor T22 (i) and the drain is connected to a node SCD (i).

The capacitor C2 (i) is a capacitor for retaining dark current. The ends of the capacitor C2 (i) are connected to the drain and source of the transistor T22 (i), respectively. The capacitor C2 (i) is charged when the transistor T21 (i) is turned on and discharged when the transistor T22 (i) is turned on.

Referring to FIG. 2 again, the select driver 42 is a driver for selecting the pixels 53 (i, j) in the cells 41 (1) to 41 (m). The select driver 42 is supplied with a timing signal Stm1 from the head control 46 and generates high level cell selection signals Select (1) to Select (n) for selecting the cells 41 (1) to 41 (m) based on the timing signal Stm1.

The select driver 42 outputs the generated high level cell selection signal Select (1) to a select line Ls (1) to select the pixels 53 (1, 1) to 53 (m, 1), . . . , and outputs the generated high level cell selection signal Select (n) to a select line Ls (n) to select the pixels 53 (1, n) to 53 (m, n).

The anode driver 43 is a driver for making the organic EL elements E (i, j) of the pixels 53 (i, j) in the cells 41 (1) to 41 (m) emit light. The anode driver 43 applies to the pixels 53 (i, j) in the cells 41 (1) to 41 (m) anode signals Anode (1) to Anode (n) of a voltage VH, for example set to +15 V, respectively.

The anode driver 43 is supplied with a timing signal Stmt from the head controller 46 and generates the anode signals Anode (1) to Anode (n).

The anode driver 43 outputs the anode signals Anode (1) to Anode (n) of a voltage VH to anode lines La (1) to La (n), respectively, to make the organic EL elements E (i, j) of the pixels 53 (i, j) selected by the select driver 42 emit light.

For example, when the select driver 42 outputs a high level cell selection signal Select (1) to the select line Ls (1) to select the pixels 53 (1, 1) to 53 (m, 1), the anode driver 43 outputs an anode signal Anode (1) of a voltage VH to the anode line La (1). Consequently, the individual organic EL elements E (1, 1), . . . , and E (m, 1) of the selected pixels 53 (1, 1) to 53 (m, 1) emit light.

The period of time during which the anode signal Anode (j) of a voltage VH is supplied is the emission time of the organic EL element E (i, j) or the anode time.

The data driver 44 is a driver for writing gradation signals (corrected gradation signals) Vdata (1) to Vdata (m) supplied from the head controller 46 in the capacitors C1 (i, j) of the cells 53 (i, j) selected by the select driver 42.

For example, when the select driver 42 outputs a high level cell selection signal Select (1) to the select line Ls (1) to select the pixels 53 (1,1) to 53 (m, 1), the data driver 44 outputs the gradation signals Vdata (1) to Vdata (m) to the data lines Ld (1) to Ld (m), respectively.

In this way, the data driver 44 writes the gradation signals Vdata (1) to V data (m) in the capacitors C1 (1, 1), . . . , and C1 (m, 1) of the pixels 53 (1, 1), . . . , and 53 (m, 1) selected by the select driver 42, respectively.

The select driver 42, anode driver 43, and data driver 44 make the organic EL elements E (i, j) in the cell 41 (i) emit light one by one for measuring the emission quantity of the organic EL elements E (i, j).

The sensor driver 45 is a driver for driving and controlling the optical sensor circuits 52 (i) of the organic EL panel 41.

Figure 5:
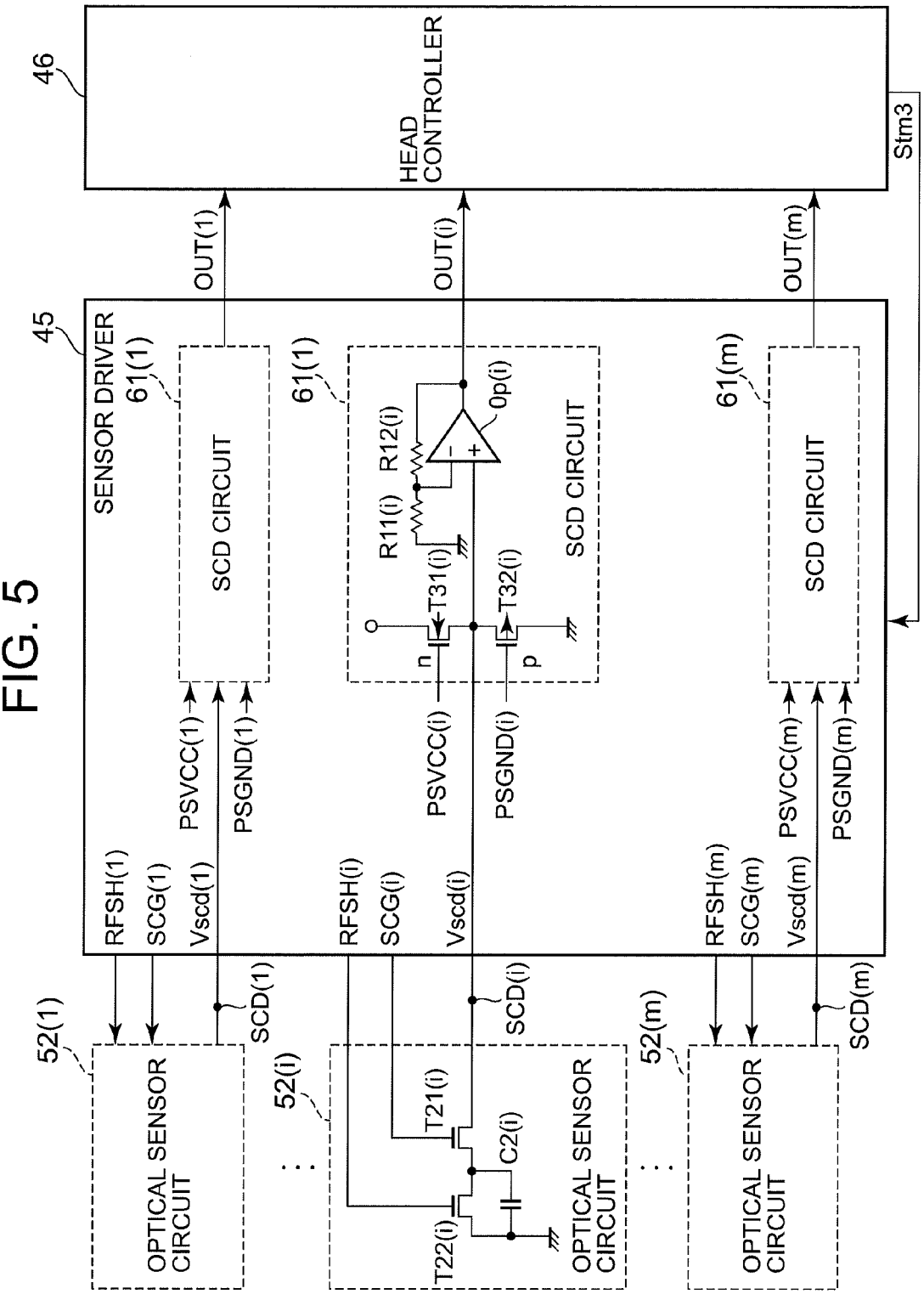
FIG. 5 is an illustration showing the structure of an optical sensor circuit and sensor driver.

As shown in FIG. 5, the sensor driver 45 is supplied with a timing signal Stm3 from the head controller 46 and generates a charge control signal SCG (i) and a refresh signal RFSH (i). The charge control signal SCG (i) and refresh signal RFSH (i) are supplied to the organic EL panel 41 to drive the optical sensor circuit 52 (i).

The sensor driver 45 comprises SCD circuits 61 (i) (i=1 to m) and controls the potentials Vscd (i) of the nodes SCD (i).

The SCD circuit 61 (i) consists of transistors T31 (i) and T32 (i), an operational amplifier Op (i), and resistances R11 (i) and R12 (i).

The transistor T31 (i) is a TFT formed by an n-channel FET. The transistor T32 (i) is a TFT formed by a p-channel FET.

The source of the transistor T31 (i) is connected to the node SCD (i) and a positive voltage Vcc is applied to the drain. Supplied with a high level voltage PSVCC (i) to its gate, the transistor T31 (i) is turned on.

The drain of the transistor T32 (i) is connected to the node SCD (i) and the source is set to the ground potential. Supplied with a low level voltage PSGND (i) to its gate, the transistor T32 (i) is turned on.

The operational amplifier Op (i) amplifies the potential of the node SCD (i). The resistances R11 (i) and R12 (i) are connected. The inverting terminal (−) of the operational amplifier Op (i) is connected to the connection point between the resistances R11 (i) and R12 (i). One end of the resistance R12 (i) is connected to the output terminal.

The noninverting terminal (+) of the operational amplifier Op (i) is connected to the source of the transistor T31 (i) and the drain of the transistor T32 (i).

The sensor driver 45 supplies sensor output signals OUT (i) amplified by the operational amplifiers Op (i) to the head controller 46.

Figure 6:
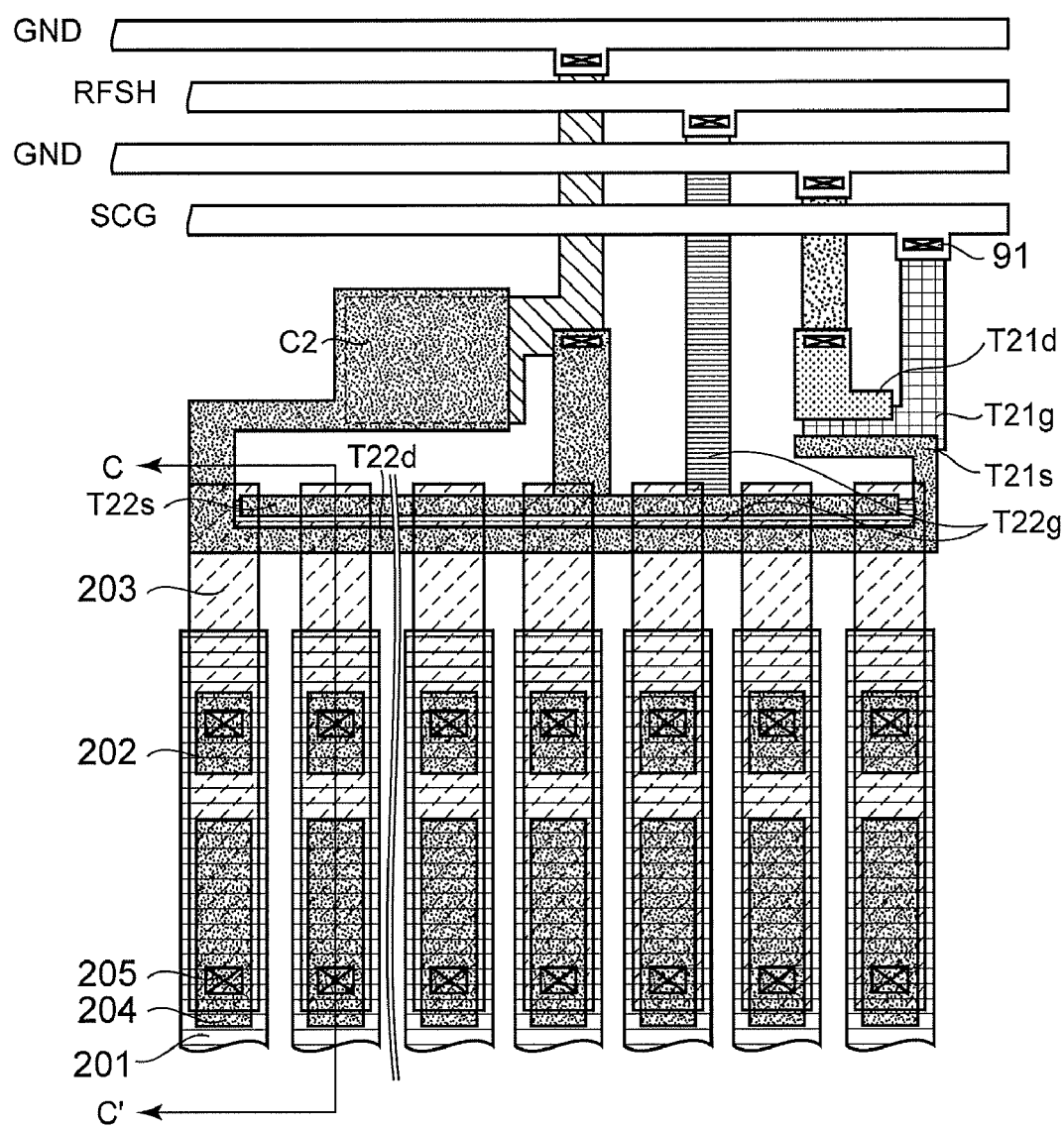
FIG. 6 is a plane view showing the device structure of organic EL elements and an optical sensor circuit.

FIG. 6 is a partial diagrammatic top-view of pixels 53 (i, j) and an optical sensor circuit 52 (i) according to this embodiment.

Figure 7:
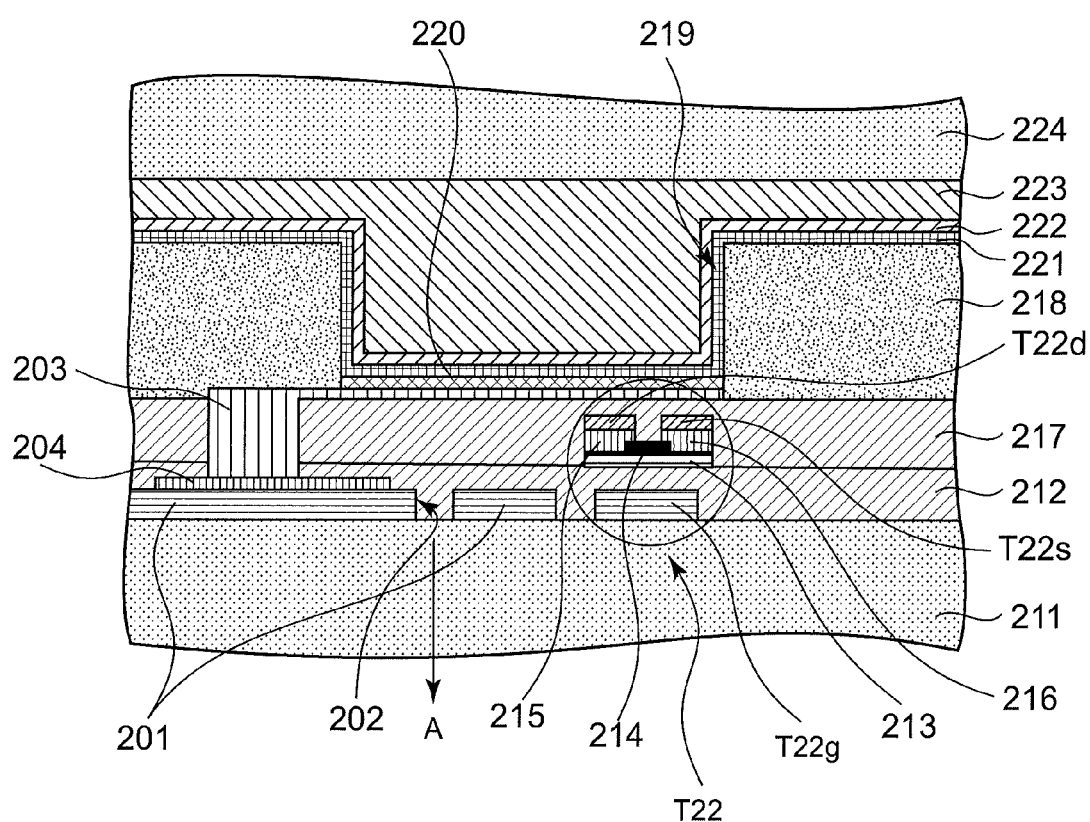
FIG. 7 is a cross-sectional view showing the device structure of an organic EL element and optical sensor circuit.

FIG. 7 is a cross-sectional view at the line C'-C' in FIG. 6.

As shown in FIG. 6, the lighting circuit 51 (i) has a thin metal film wire 201, a pixel-size opening 202, a transparent electrode (organic EL anode) 203, a transparent electrode 204, and a transparent electrode contact 205. The lighting circuit 51 (i) is formed for each pixel 53 (i, j) in the main scan direction.

As shown in FIG. 6, the transistor T22 consists of a gate T22g, a source T22s, and a drain T22d. Here, the suffixes i and j are omitted.

The transistor T21 consists of a gate T21g, a source T21s, and a drain T21d. The capacitor C2 is formed near the transistor T22.

The gate T22g of the transistor T22 is connected to the refresh signal RFSH supply line and the source T22s is connected to the ground GND.

The drain T22d of the transistor T22 is connected to the gate T21g of the transistor T21 and to the source T22s of the transistor T22.

The gate T21g of the transistor T21 is connected to the charge control signal SCG supply line and the drain T21d is connected to the node SCD.

As shown in FIG. 7, the thin metal film wire 201 and gate T22g of the transistor T22 are formed on a glass substrate 211 and the transparent electrode 204 is formed on the thin metal film wire 201.

A SiN film 212 as an insulating film is formed on the glass substrate 211. The thin metal film wire 201 and gate T22g are covered with the SiN film 212.

As components of the transistor T22, an i-Si film 213 is formed on the SiN film 212 and a SiN film 214, an n⁺ Si film 215, and an n⁺ Si film 216 are formed on the i-Si film 213.

Then, the drain T22d and source T22s of the transistor T22 are formed on the n⁺ Si film 215 and n⁺ Si film 216, respectively.

A SiN film 217 as an interlayer insulating film is formed on the SiN film 212. The SiN film 214, n⁺ Si film 215, n⁺ Si film 216, drain T22d, and source T22s are covered with the SiN film 217 as an insulating film.

The transparent electrode 203 as the anode electrode of the organic EL element E (i, j) is formed through the SiN film 217 and SiN film 212 and makes contact with the transparent electrode 204.

A polyimide resin 218 as a partition is formed on the SiN film 217. An opening 219 is formed in the polyimide resin 218. A light emitting pixel part (light emission layer) 220 of an organic EL element E (i, j) consisting of a light emitting polymer material capable of emitting fluorescent or phosphorescence is formed on the transparent electrode 203 in the opening 219.

A film 221 consisting of an alkali earth metal such as Mg, Ca, and Ba, or oxide or metallic alloy thereof and serving as an electron transport layer and an Al film 222 serving as the cathode electrode are formed on the polyimide resin 218 and light emitting pixel part 220.

Then, an epoxy resin film 223 as a sealing film is formed on the Al film 222.

Then, the pixels are sealed by a sealing glass 224.

A hole-injection layer and an interlayer can further be formed between the transparent electrode 203 and light emitting pixel part 220 in the opening 219.

The light from the organic EL elements E (i, j) irradiates the gate T22g of the transistor T22 and emerges from the pixel-size opening 202 in the arrowed direction A. The light emerging from the pixel-size opening 202 irradiates the photoconductor drum 21.

When the capacitor C2 is charged and the light from the organic EL element E irradiates the gate T22g of the transistor T22 that is turned on, a channel is formed in accordance with the emission quantity and a current runs between the drain T22d and source T22s.

The drain T21d of the transistor T21 is connected to the node SCD. The emission quantity of the organic EL element E can be measured by measuring the potential Vscd of the node SCD.

In other words, the gate T22g serves as a sensor gate and the transistor T22 serves as an optical sensor. The capacitor C2 serves as a dark current-retaining capacitor. The transistor T21 severs as a charging TFT. The transistor T31 serves as a read TFT.

Referring to FIG. 2 again, the head controller 46 controls the select driver 42, anode driver 43, data driver 44, and sensor driver 45 and comprises a CPU (central processing unit). ROM (read only memory), RAM (random access memory), etc.

The head controller 46 receives image data D_image, paper size, and control signals such as the horizontal control signal /HSYNC and vertical control signal /VSYNC in time with the conveying speed from the raster image processor circuit of the control circuit 11.

The head controller 46 drives and controls the select driver 42, anode driver 43, data driver 44, and sensor driver 45 according to the above received control signals.

The head controller 46 corrects the luminance of the organic EL elements E (i, j) of the cells 53 (i, j) periodically or with the timing determined based on the using conditions of the image forming apparatus 1.

Figure 8:
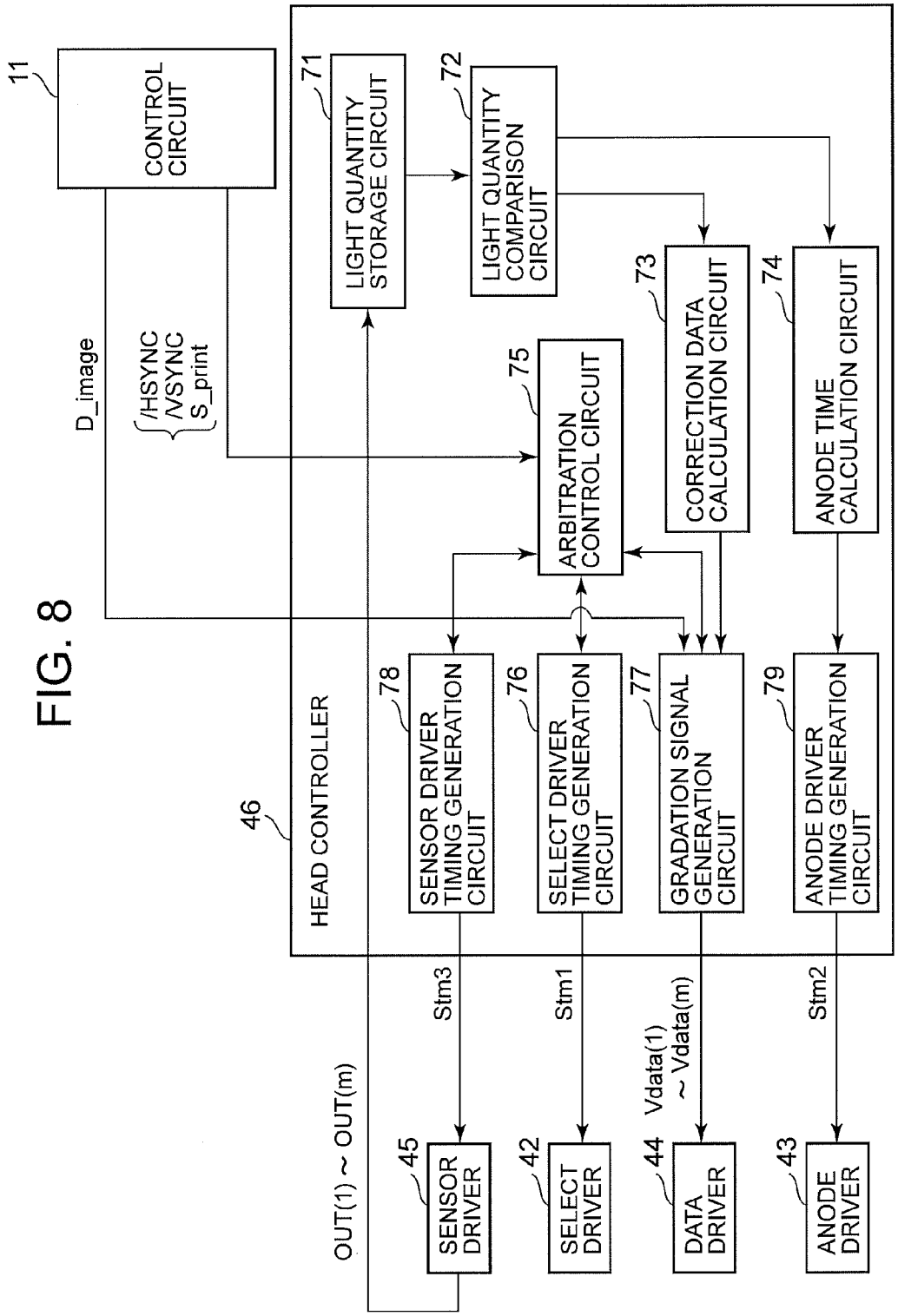
FIG. 8 is a block diagram showing the structure of the head controller.

Therefore, as shown in FIG. 8, the head controller 46 comprises a light quantity storage circuit 71, a light quantity comparison circuit 72, a correction data calculation circuit 73, an anode time calculation circuit 74, an arbitration control circuit 75, a select driver timing generation circuit 76, a gradation signal generation circuit 77, a sensor driver timing generation circuit 78, and an anode driver timing generation circuit 79.

Figure 9:
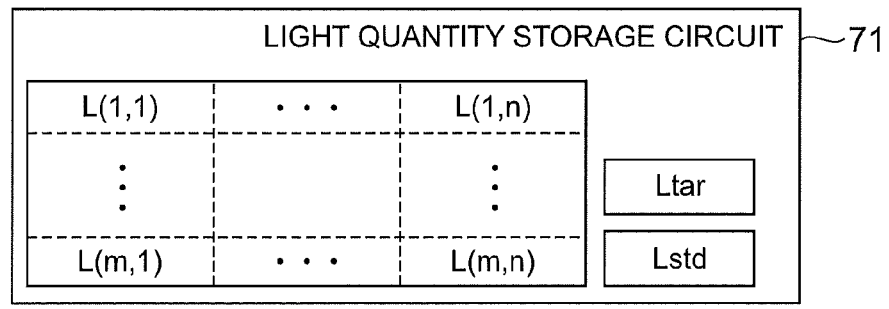
FIG. 9 is an illustration showing the emission quantity stored in the light quantity storage circuit.

The light quantity storage circuit 71 is supplied with sensor output signals OUT (1) to OUT (m) from the sensor driver 45 each time the luminance is measured. Then, it stores the supplied sensor output signals OUT (1) to OUT (m) as emission quantities L (i, j) in association with the organic EL elements E (i, j) as shown in FIG. 9.

The light quantity storage circuit 71 further stores a target reference light quantity Ltar as the target value of correction of the emission quantities L (i, j) and a reference light quantity Lstd based on the currently measured emission quantities L (i, j). Here, the target reference light quantity Ltar is set, for example, to the reference light quantity Lstd based on the emission quantities L (i, j) obtained by measuring the luminance while the organic EL elements E (i, j) on the organic EL panel 41 have initial properties immediately after shipment.

The light quantity comparison circuit 72 compares the emission quantities L (i, j) of the organic EL elements E (i, j) measured by the optical sensor circuit 52 (i) with the reference light quantity Lstd for this measurement in the light quantity storage circuit 71.

In this embodiment, the reference light quantity Lstd is set to the emission quantity L (i, j) of the brightest organic EL element E (i, j). More specifically, the maximum light quantity Lmax among all measured emission quantities of the organic EL elements E (i, j) is used as the reference light quantity Lstd.

The light quantity comparison circuit 72 makes reference to all emission quantities L (i, j) stored in the light quantity storage circuit 71, acquires the maximum light quantity Lmax, and sets the reference light quantity Lstd to the acquired maximum light quantity Lmax.

Then, the light quantity comparison circuit 72 compares the reference light quantity Lstd with the emission quantity L (i, j) of each organic EL element E (i, j) and acquires the difference ΔL (i, j) between the reference light quantity Lstd and the emission quantity L (i, j) of the organic EL element E (i, j). The light quantity comparison circuit 72 supplies the acquired difference ΔL (i, j) to the correction data calculation circuit 73.

The light quantity comparison circuit 72 further acquires the difference ΔLstd between the reference light quantity Lstd and target reference light quantity Ltar stored in the light quantity storage circuit 71. The light quantity comparison circuit 72 supplies the acquired difference ΔLstd to the anode time calculation circuit 74.

The correction data calculation circuit 73 acquires a gradation signal correction value ΔV based on the difference ΔL (i, j) supplied from the light quantity comparison circuit 72 and supplies it to the gradation signal generation circuit 77.

In other words, the correction data calculation circuit 73 is a circuit for regulating the emission quantities L (i, j) of the organic EL elements E (i, j) to the reference light quantity Lstd (=the maximum light quantity Lmax).

Figure 10:
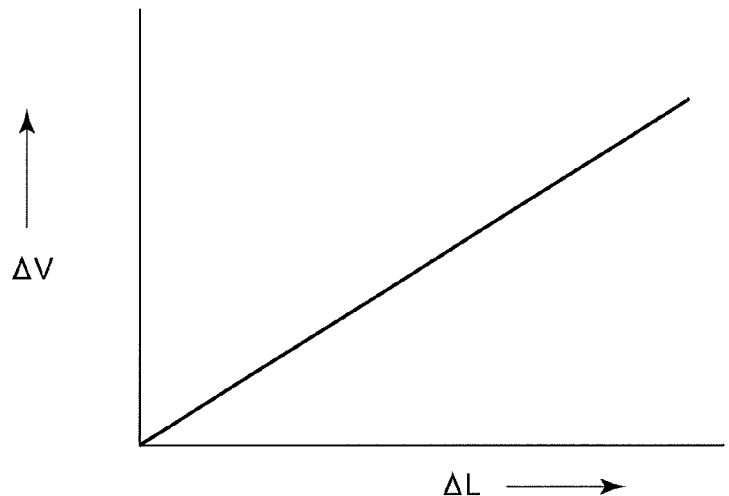
FIG. 10 is a graphical representation showing the relationship of the difference between the reference light quantity and emission quantity with the gradation signal correction value.

Therefore, the correction data calculation circuit 73 stores the relationship of the difference in emission quantity ΔL with the gradation signal correction value ΔV as shown in FIG. 10 in advance. Then, the correction data calculation circuit 73 acquires the gradation signal correction value ΔV (i, j) according to the difference ΔL (i, j) based on this relationship.

The correction data calculation circuit 73 comprises a correction data storage circuit and stores the acquired gradation signal correction value ΔV (i, j) in association with the pixel 53 (i, j).

Then, the anode time calculation circuit 74 calculates and corrects the anode time Ta or the period of time during which the anode signals Anode (1) to Anode (n) of a voltage VH are output so as to generate a corrected anode time Ta'. The anode time calculation circuit 74 has an anode time storage circuit. The anode time storage circuit stores the generated corrected anode time Ta'.

The anode time calculation circuit 74 generates the corrected anode time Ta' based on the difference ΔLstd supplied from the light quantity comparison circuit 72.

Figure 11:
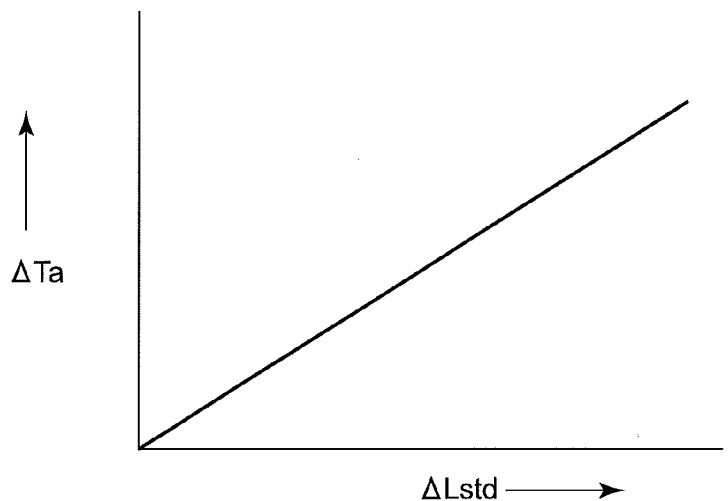
FIG. 11 is a graphical representation showing the relationship of the difference between the target reference light quantity and reference light quantity with the anode time correction value.

Therefore, the anode time calculation circuit 74 stores the relationship of the difference ΔLstd with the anode time correction value ΔTa as shown in FIG. 11 in advance.

The luminance of the organic EL elements E (i, j) corresponds to the light intensity per unit area. Therefore, the relationship shown in FIG. 11 can be obtained by the relationship: the aforementioned emission quantity=light intensity per unit area×anode time (emission time).

The anode time calculation circuit 74 acquires an anode time correction value ΔTa from the relationship shown in FIG. 11 based on the difference ΔLstd supplied from the light quantity comparison circuit 72, adds the anode time correction value ΔTa to the anode time Ta to generate a corrected anode time Ta', and stores the generated corrected anode time Ta' in the anode time storage circuit together with the anode time correction value ΔTa.

When the image data D_image are supplied for printing, the anode time calculation circuit 74 reads the corrected anode time Ta' from the anode time storage circuit and supplies it to the anode driver timing generation circuit 79.

The arbitration control circuit 75 receives the horizontal control signal /HSYNC, vertical control signal /VSYNC, and printer control signals S_print from the control circuit 11 and monitors and controls the select driver timing generation circuit 76, anode driver timing generation circuit 79, gradation signal generation circuit 77, and sensor driver timing generation circuit 78 for adjusting the timing.

The select driver timing generation circuit 76 generates a timing signal Stm1 for the select driver 42 to generate cell selection signals Select (1) to Select (n) under the control of the arbitration control circuit 75.

The head controller 46 supplies the timing signal Stm1 generated by the select driver timing generation circuit 76 to the select driver 42.

The gradation signal generation circuit 77 is supplied with image data D_image from the control circuit 11 and generates gradation signals (corrected gradation signals) Vdata (1) to Vdata (m) corresponding to the image data D_image.

The gradation signal generation circuit 77 is supplied with a gradation signal correction value ΔV corresponding to the difference in emission quantity ΔL (i, j) from the correction data calculation circuit 73 along with the image data D_image from the raster image processor circuit of the control circuit 11.

The gradation signal generation circuit 77 corrects an original gradation signal Vdata_org, for example, by adding the gradation signal correction value ΔV to the original gradation signal Vdata_org corresponding to the supplied image data D_image to generate the gradation signals (corrected gradation signals) Vdata (1) to Vdata (m).

The correction is not restricted to addition and can be multiplication. In such a case, the gradation signal Vdata (i) is multiplied by a correction coefficient corresponding to the difference ΔL instead of adding the gradation signal correction value ΔV to the original gradation signal Vdata_org.

The gradation signal generation circuit 77 sets the voltage value of the gradation signals Vdata (1) to Vdata (m) to a fixed value for measuring the emission quantities L (i, j) of the organics EL elements E (i, j). The voltage value of the gradation signals Vdata (1) to Vdata (m) is set, for example, to a voltage value at which the organic EL elements E (i, j) emit light at the maximum luminance.

The head controller 46 supplies the gradation signals Vdata (1) to Vdata (m) generated by the gradation signal generation circuit 77 to the data driver 44.

The sensor driver timing generation circuit 78 generates a timing signal Stm3 for controlling the sensor driver 45 under the control of the arbitration control circuit 75.

The timing signal Stm3 is a timing signal for the sensor driver 45 to generate a refresh signal RFSH (i) and a charge control signal SCG (i). The head controller 46 supplies the timing signal Stm3 generated by the sensor driver timing generation circuit 78 to the sensor driver 45.

The anode driver timing generation circuit 79 generates a timing signal Stm2 for setting the timing of the anode signal Anode (i) based on the anode time Ta calculated by the anode time calculation circuit 74.

The head controller 46 supplies the timing signal Stm2 generated by the anode driver timing generation circuit 79 to the anode driver 43 to control the anode time Ta.

Figure 12:
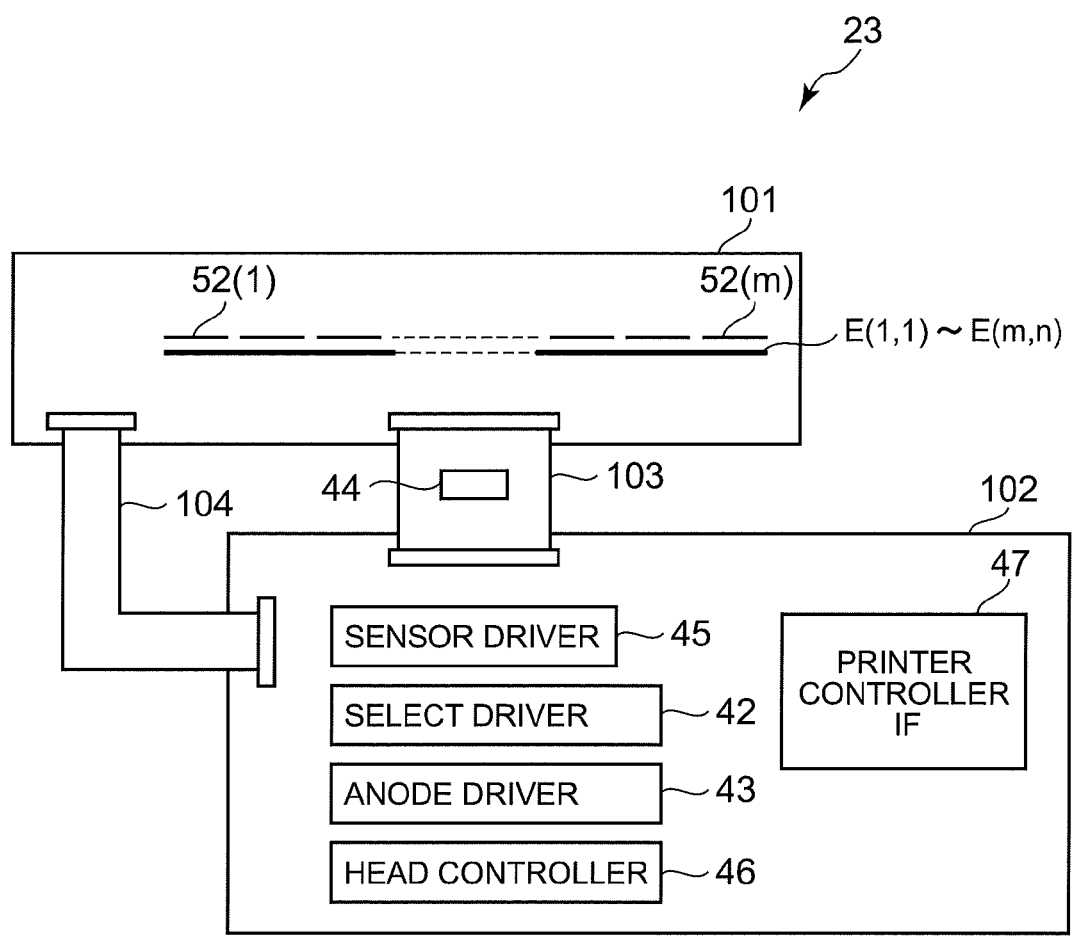
FIG. 12 is an illustration of the exposure head on which the organic EL panel and head controller substrate are mounted.

The exposure head 23 having the above structure is mounted, for example, as shown in FIG. 12. More specifically, the exposure head 23 comprises an organic EL panel substrate 101, a head controller substrate 102, a COF (chip on film) 103, and an FPC (flexible printed circuit) 104.

Multiple organic EL elements E (i, j) and optical sensor circuits 52 (i) are placed on the organic EL panel substrate 101. The multiple organic EL elements E (i, j) are arranged, for example, in a row in the main scan direction. The transistor T22 (i) of the optical sensor circuit 52 (i) has a channel width, for example, corresponding to n pixels 53 (, j) of a lighting circuit 51 (i) in the main scan direction.

The select driver 42, sensor driver 45, anode driver 43, and head controller 46, and a printer controller interface ("printer controller IF" in the figure) 47 are mounted on the head controller substrate 102.

The organic EL panel substrate 101 and head controller substrate 102 are connected by the COF 102 and FPC 104. The data driver 43 is mounted on the COF 103.

Referring to FIG. 1 again, the developer 24 contains toner. The developer 24 charges the toner therein to a low negative potential Vtoner.

The developing roller 25 rotates and advances the toner in the developer 24 to the section facing the photoconductor drum 21.

A developing bias Vbias, for example −250 V, is applied to the developing roller 25 by a developing bias power source (not shown).

The developing bias Vbias, toner potential Vtoner, and electrostatic latent image potential Velec are determined to satisfy the relationship: Vbias<Vtoner<Velec.

The developing roller 25 utilizes the potential difference (Vtoner−Vbias) to adsorb the toner in the developer 24 and rotates and advances it.

The potential difference between the electrostatic latent image potential Velec and developing bias Vbias (Velec−Vbias) is 200V at the maximum. The electrostatic latent image potential Velec is relatively positive to the developing bias Vbias.

Therefore, as the developing roller 25 rotates and advances the toner to the section facing the photoconductor drum 21, the toner is transferred to the photoconductor drum 21 charged to a potential Vtoner to form a toner image 3.

The toner adherence amount of the toner image 3 (the developed image density) is determined by the potential Velec corresponding to the exposure value Exp on the photoconductor drum 21.

The conveyer belt 26 conveys a paper 2 placed thereon. The transfer roller 27 transfers the toner image 3 formed on the photoconductor drum 21 onto the paper 2. The transfer roller 27 is provided under the photoconductor drum 21.

The fixing rollers 28a and 28b thermally fix the toner image 3 and discharge it outside the printer.

The cleaner 29 removes any toner that has not transferred and remains on the photoconductor drum 21. The eraser light source 30 uniformly neutralizes the surface of the photoconductor drum 21.

Operation of the image forming apparatus 1 according to this embodiment will be described hereafter.

<Image Forming Operation>

First, the image forming operation for forming (printing) an image corresponding to image data on a paper 2 will be described.

In this embodiment, for simplified explanation, the organic EL panel 41 has six cells 41 (i) (i=1 to 6, m=6) and the lighting circuits 51 (1) to 51 (6) each consist of four pixels 53 (1, 1) to 53 (1, 4), 53 (2, 1) to 53 (2, 4), 53 (3, 1) to 53 (3, 4), 53 (4, 1) to 53 (4, 4), 53 (5, 1) to 53 (5, 4), and 53 (6, 1) to 53 (6, 4), respectively.

A total of 24, 6×4, organic EL elements E (i, j) are arranged in a row in the main scan direction. However, the organic EL elements E (i, j) as many as corresponding to a paper size are provided in a row or in multiple rows on the substrate of the exposure head 23 in practice.

The control circuit 11 supplies the horizontal control signal /HSYNC, vertical control signal /VSYNC, and printer control signals S_print to the image forming circuit 12 to control the drive circuit of the photoconductor drum 21 and rotate the photoconductor drum 21 in the arrowed direction shown in FIG. 1 (within the photoconductor drum 21). The charging roller 22 uniformly charges the photoconductor drum 21 to a negative potential Vcharge for initialization.

The exposure head 23 conducts optical writing (exposure) on the charged photoconductor drum 21 based on the control signals supplied from the control circuit 11.

Supplied with the horizontal control signal /HSYNC, vertical control signal /VSYNC, and printer control signals S_print, the arbitration control circuit 75 of the head controller 46 of the exposure head 23 monitors and controls the select driver timing generation circuit 76, anode driver timing generation circuit 79, gradation signal generation circuit 77, and sensor driver timing generation circuit 78 for adjusting the timing.

The select driver timing generation circuit 76 generates a timing signal Stm1 under the control of the arbitration control circuit 75 and supplies the generated timing signal Stm1 to the select driver 42.

Figure 13:
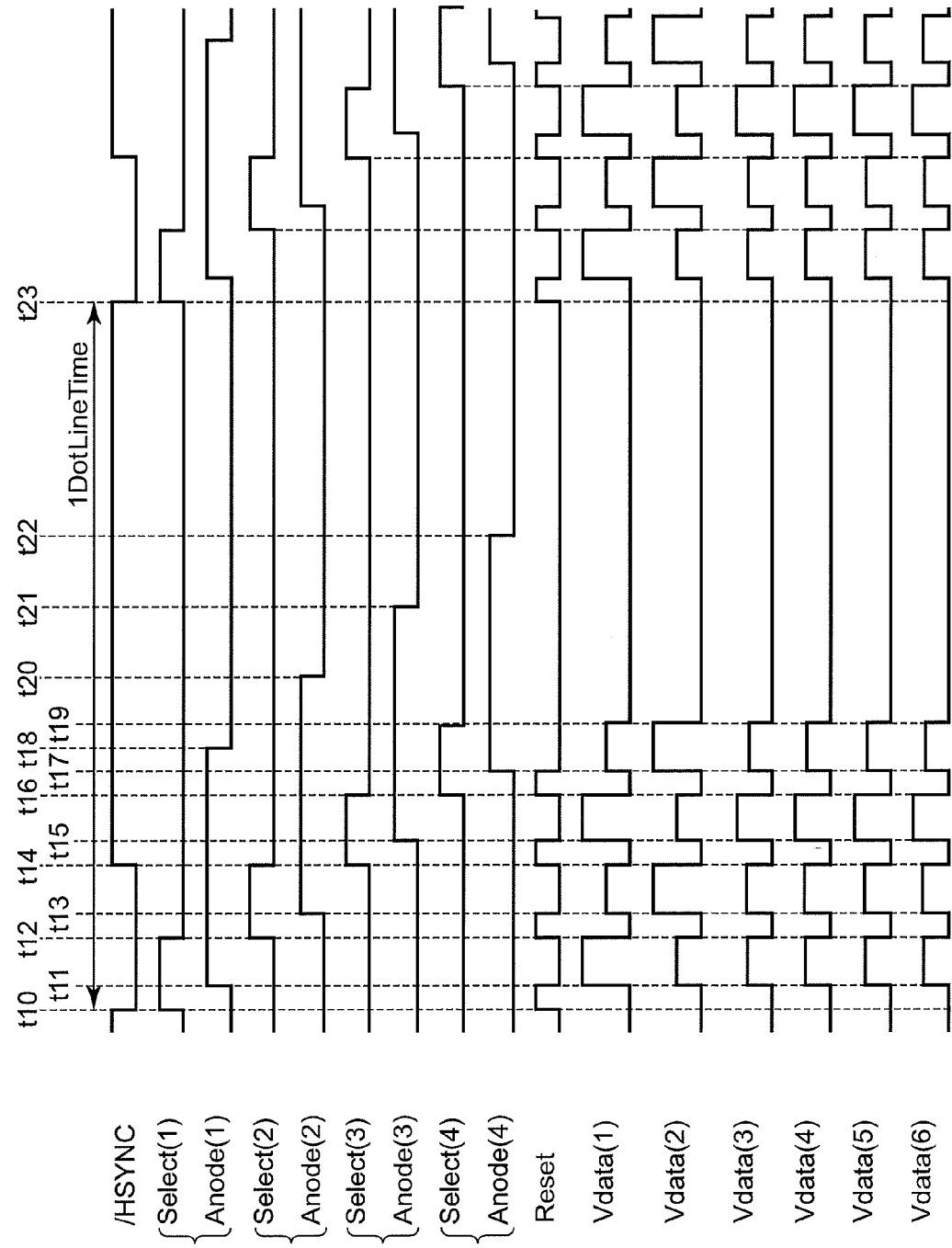
FIG. 13 is a timing chart showing the exposure timing of the exposure head.

As shown in FIG. 13, when the control circuit 11 lowers the horizontal control signal /HSYNC at a time t10, the select driver 42 outputs a high level cell section signal Select (1) to the select line Ls (1) at the time t10. Then, it lowers the cell section signal Select (1) to a low level at a time t12.

The time from t10 to t12 is the cell-selected period of the cell 41 (1) and the time from t12 to t23 is the cell-nonselected period of the cell 41 (1). Here, "1 Dot Line Time" from t10 to t23 is the time allowed for forming dots for one line. The "1

Dot Line Time" corresponds to the interval between the active states of the horizontal control signal /HSYNC.

For example, provided that the dots are formed in printing at 1200 dpi×1200 dpi (dots/inch), the print speed is 40 ppm (pages/minute), a A4 size paper has a width of 210 mm, and the paper is advanced 50 mm apart, papers are moved over a distance of (210 mm+50 mm)×40 in the sub-scan direction. One inch is equal to 25.4 mm. Therefore, the "1 Dot Line Time" is expressed by the following equation and is approximately 122 μsec.

[Math 1]

$$1 DotLineTime = \frac{\frac{25.4 \text{ mm}}{1200 dpi}}{\frac{(210 \text{ mm} + 50 \text{ mm}) \times 40(枚)}{60 \text{ sec}}} \approx 122 \text{ } \mu sec \quad 40 \text{ (sheets)}$$

The gradation signals Vdata (1) to (6) output from the data driver 44 are valid only in the cell-selected period. High level cell selection signals Select (1) to Select (4) are sequentially applied with different timing within the 1 Dot Line time, whereby multiple organic EL elements E (1, 1) to E (6, 4) can be turned on with one output from the data driver 44.

When four cell selection signals Select (1) to Select (4) are sequentially output for all pixels 53 (1, 1) to 53 (6, 4), the cell selection time is (122/4)μsec=30.5 μsec at most under the conditions of the aforementioned 1200 dpi and 40 ppm.

The data driver 44 outputs gradation signals Vdata (1) to Vdata (6) to the pixels 53 (1, 1) to 53 (6, 4) during this cell-selected period.

The anode driver 43 outputs an anode signal Anode (1) of a voltage VH to the anode line La (1) at a time t11 and lowers the anode signal Anode (1) to the same potential as the cathode potential of the organic EL elements E (1, 1) to E (4, 6) at a time t18.

The select driver 42 outputs a high level cell selection signal Select (1) to the select line Ls (1) at the time from t10 to t11, whereby the transistors T2 (1, 1), T2 (2, 1), T2 (3, 1), T2 (4, 1), T2 (5, 1), and T2 (6, 1) are turned on.

The data driver 44 outputs a high level reset signal Reset, whereby the transistors T11 (1) to T11 (6) are turned on.

Figure 14:
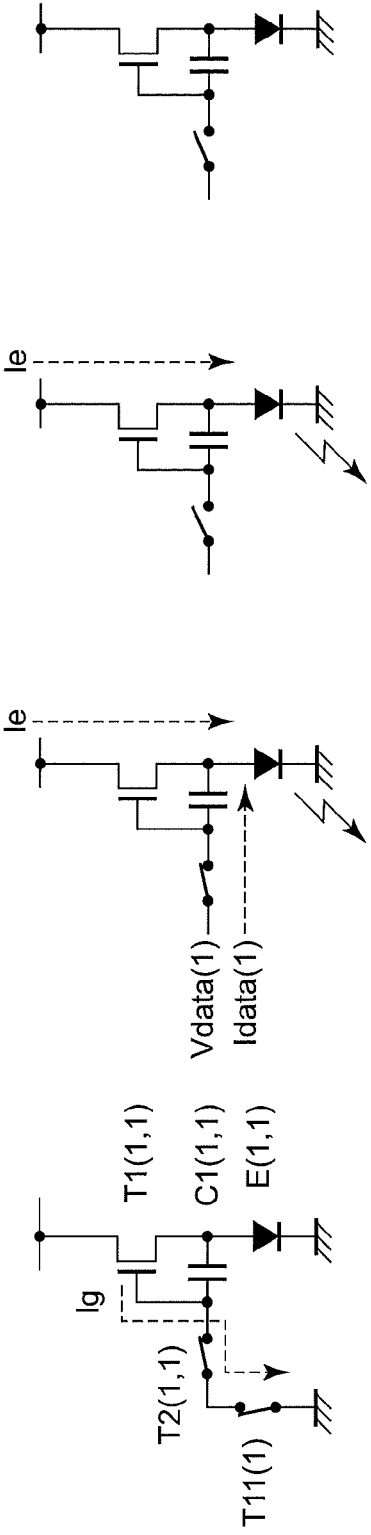
FIGS. 14 A, B, C, and D are illustrations showing the behavior of a pixel.

As shown in FIG. 14A, when transistors T2 (1, 1) and T11 (1) are turned on, a gate current Ig runs from the gate of the transistor T1 (1, 1) to the ground line via the transistors T2 (1, 1) and T11 (1), whereby the capacitor C1 (1, 1) is reset. The capacitors C1 (2, 1), C1 (3, 1), C1 (4, 1), C1 (5, 1), and C1 (6, 1) are similarly reset.

Then, at the time t11 shown in FIG. 13, the data driver 44 lowers the reset signal Reset to a low level, whereby the transistors T11 (1) to T11 (6) are turned off.

Then, when the gradation signal Vdata (1) is supplied to the pixel 53 (1, 1) at the time t11, as shown in FIG. 14B, the gradation signal Vdata (1) is applied to the gate of the transistor T (1, 1) and capacitor C1 (1, 1) from the data driver 44, whereby signal charge corresponding to the gradation signal Vdata (1) is written in the capacitor C1 (1, 1). Signal charge is similarly written in the capacitors C1 (2,1), C1 (3,1), C1 (4,1), C1 (5,1), and C1 (6,1).

The anode driver 43 outputs an anode signal Anode (1) of a voltage VH to the anode line La (1) at the time t11, whereby the transistor T1 (1, 1) supplies a current Ie corresponding to the signal charge written in the capacitor C1 (1, 1) to the organic EL element E (1, 1). Consequently, the organic EL element E (1, 1) emits light at a luminance corresponding to the supplied current Ie. The organic El elements E (2,1), E (3,1), E (4,1), E (5,1), and E (6,1) similarly emit light.

The select driver 42 lowers the cell selection signal Select (1) to a low level at a time t12 shown in FIG. 13, whereby the transistors T2 (1, 1), T2 (2, 1), T2 (3, 1), T2 (4, 1), T2 (5, 1), and T2 (6, 1) are turned off.

As shown in FIG. 14C, the capacitor C1 (1, 1) holds the gate voltage of the transistor T1 (1, 1) even if the transistor T2 (1, 1) is turned off. Therefore, the transistor T1 (1, 1) supplies the current Ie corresponding to the signal charge written in the capacitor C1 (1, 1) to the organic EL element E (1, 1). The organic EL element E (1, 1) emits light at a luminance corresponding to the supplied current Ie. The organic El elements E (2, 1), E (3, 1), E (4, 1), E (5, 1), and E (6, 1) similarly emit light.

When the anode driver 43 lowers the anode signal Anode (1) to the cathode potential of the organic EL elements E (1, 1) to E (6, 4) at a time t18 shown in FIG. 13, the current Ie is no longer supplied to the organic EL element E (1, 1) as shown in FIG. 14D, whereby the organic EL element E (1, 1) is turned off. The organic El elements E (2, 1), E (3, 1), E (4, 1), E (5, 1), and E (6, 1) are similarly turned off.

As described above, the organic El elements E (1, 1), E (2, 1), E (3, 1), E (4, 1), E (5, 1), and E (6,1) emit light at the time from t11 to t18 during which the anode driver 43 outputs an anode signal Anode (1) of a voltage VH to the anode line La (1).

Similarly, the organic El elements E (1, 2), E (2, 2), E (3, 2), E (4, 2), E (5, 2), and E (6, 2) emit light at the time from t13 to t20.

Similarly, the organic El elements E (1, 3), E (2, 3), E (3, 3), E (4, 3), E (5, 3), and E (6, 3) emit light at the time from t15 to t21.

Similarly, the organic El elements E (1, 4), E (2, 4), E (3, 4), E (4, 4), E (5, 4), and E (6, 4) emit light at the time from t17 to t22.

Figure 15:
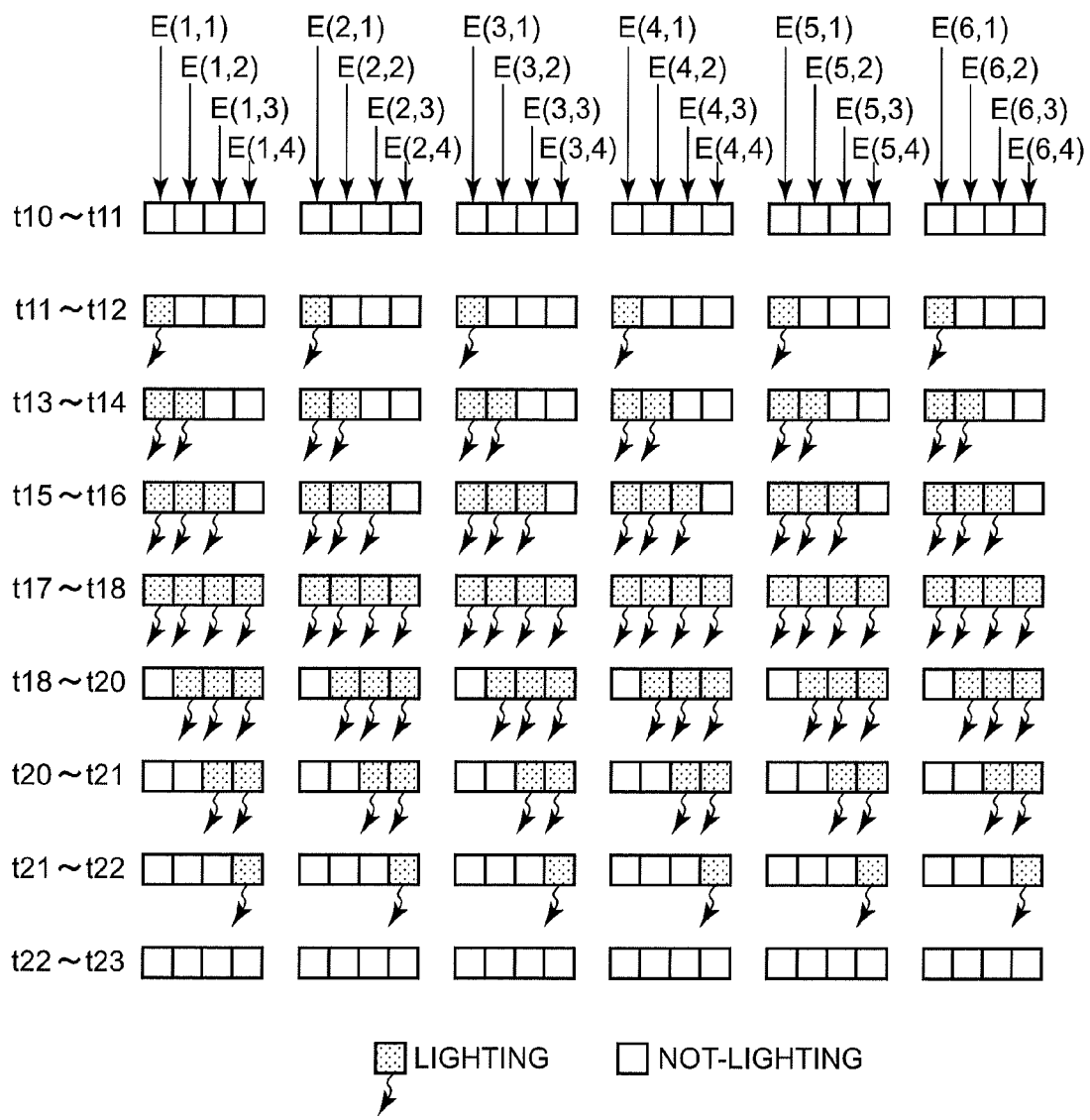
FIG. 15 is an illustration showing the emission timing of pixels.

Consequently, the organic elements E (i, j) (i=1 to 6, j=1 to 4) emit light at the time from t10 to t23 as shown in FIG. 15.

As the organic elements E (i, j) emit light, the exposure head 23 conducts optical writing on the photoconductor drum 21. Consequently, an electrostatic latent image having a negative potential Velec up to −50 V and corresponding to the image data D-image is formed in the highly negative potential part (area) uniformly formed on the peripheral surface of the photoconductor drum 21 through initial charging by the charging roller 22.

The developing roller 25 rotates and advances the toner contained in the developer 24 to the section facing the photoconductor drum 21. The toner adheres to the photoconductor drum 21 to form a toner image 3 corresponding to the electrostatic latent image on the photoconductor drum 21.

The photoconductor drum 21 rotates and advances the toner image 3 to the section facing the transfer roller 27 (transfer section). The conveyer belt 26 advances a paper 2 to the transfer roller 27. The transfer roller 27 transfers the toner image 3 on the photoconductor drum 21 onto the paper 2.

The paper 2 on which the toner image 3 is transferred is advanced further downstream. The fixing rollers 28a and 28b thermally fix the toner image 3 and discharge the paper 2 outside the machine. Consequently, an image corresponding to the image data is formed on the paper 2.

The cleaner 29 removes a tiny amount of toner that has not been transferred and remains on the photoconductor drum 21. The eraser light source 30 uniformly neutralizes the surface of the photoconductor drum 21.

<Light Quantity Correction Operation>

The operation for correcting the emission quantity of the organic EL elements E (i, j) for a proper value will be described hereafter.

The image forming apparatus 1 makes the organic EL elements E (i, j) emit light one by one for correcting the emission quantity while it is not printing, for example, upon power-on, periodically, or any time between papers during printing.

Figure 16:
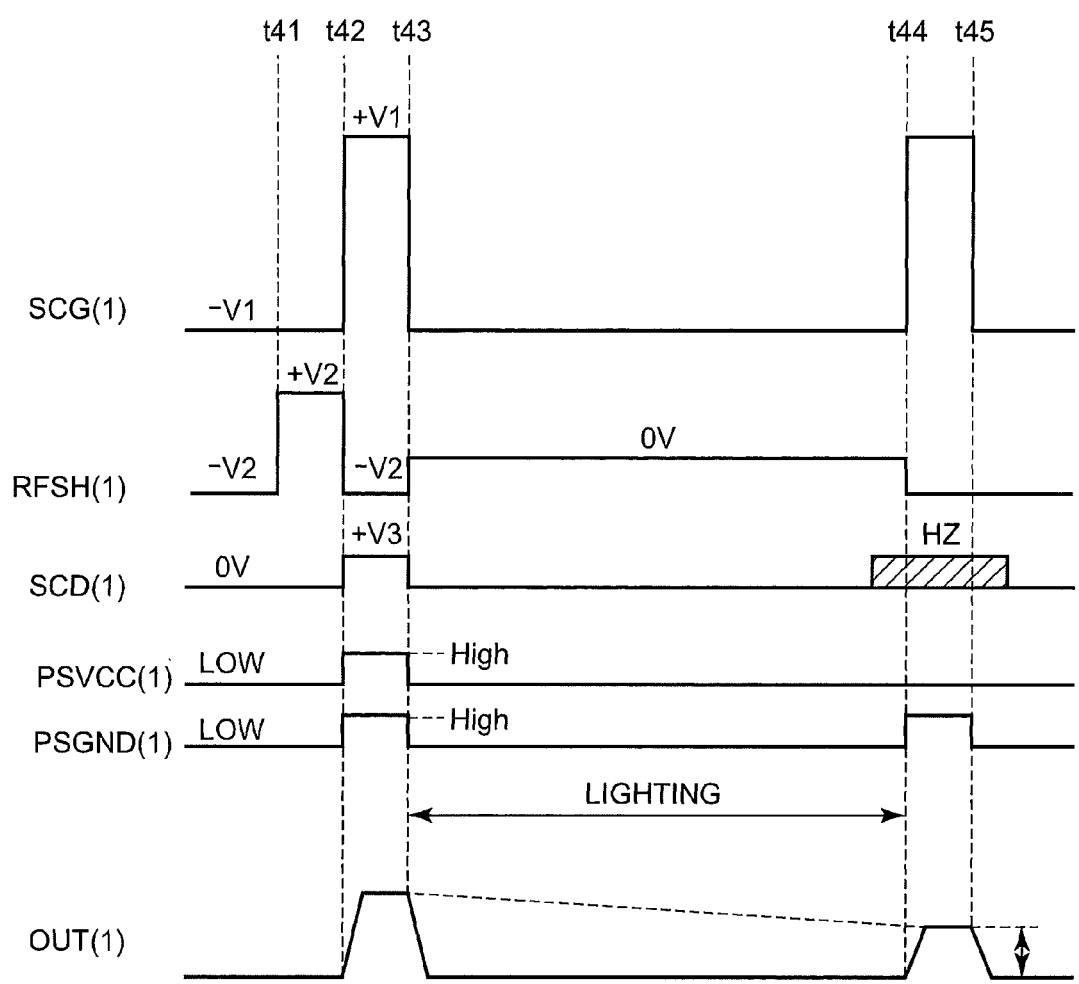
FIG. 16 is a timing chart showing the timing of measuring the emission quantity.

As shown in FIG. 16, for example, for measuring the emission quantity of the organic EL element E (1, 1), the sensor driver 45 supplies a refresh signal RFSH (1) of a voltage +V2 to the organic EL panel 41 at a time from t41 to t42.

Supplied with the refresh signal RFSH (1), the transistor T22 (1) of the optical sensor circuit 52 (1) is turned on, whereby the capacitor C2 (1) is discharged.

The sensor driver 45 sets the refresh signal RFSH (1) to a voltage −V2 at the time t42 after the discharge, supplies a charge control signal SCG (1) of a voltage +V1 to the organic EL panel 41, and supplies a high level signal PSVCC (1) and a high level signal PSGND (1) to the SCD circuit 61 (1).

Supplied with the refresh signal RFSH (1) of a voltage −V2 at its gate, the transistor T22 (1) is turned off. Supplied with the charge control signal SCG (1) of a voltage +V1 at its gate, the transistor T21 (1) is turned on.

Supplied with the high level signal PSVCC (1), the transistor T31 (1) of the SCD circuit 61 (1) is turned on. Supplied with the high level signal PSGND (1), the transistor T32 (1) is turned off.

After the transistors T21 (1) and T31 (1) are turned on and the transistor T32 (1) is turned off, the capacitor C2 (1) is charged at a voltage +Vcc.

At a time t43 after the capacitor C2 (1) is charged, the sensor driver 45 raises the charge control signal SCG (1) to a voltage −V1, sets the refresh signal RFSH (1) to 0 V, and lowers the signal PSVCC (1) to a low level and the signal PSGND (1) to a low level.

Supplied with the charge control signal SCG (1) of a voltage −V1 at its gate, the transistor T21 (1) is turned off. Supplied with the low level signal PSVCC (1) at its gate, the transistor T31 (1) is turned off. Supplied with the low level signal PSGND (1) at its gate, the transistor T32 (1) is turned on.

At the time t43, the image forming apparatus 1 sets the voltage of the gradation signals Vdata (1) to Vdata (6) to a fixed value and make the organic EL element E (1, 1) emit light.

For acquiring the emission quantity L (1, 1), the sensor driver 45 sets the refresh signal RFSH (1) to 0 V as shown in FIG. 16. Because of this, a channel is easily formed between the drain and source of the transistor T22 when the light is emitted. When the channel is formed between the drain and source of the transistor T22, a drain current corresponding to the emission quantity L (1, 1) starts to run and the capacitor C2 (1) starts to discharge.

Before a predetermined time t44 following the time t43, the sensor driver 45 sets the refresh signal RFSH (1) to a voltage −V2 to turn off the transistor T22 (1) and stop the discharge of the capacitor C2 (1).

The sensor driver 45 supplies a low level signal PSVCC (1) and a high level signal PSGND (1) to the SCD circuit 61 (1).

Supplied with the low level signal PSVCC (1) at its gate, the transistor T31 (1) of the SCD circuit 61 (1) is turned off. Supplied with the high level signal PSGND (1) at its gate, the transistor T32 (1) is turned off. Consequently, the drain terminal of the transistor T21 (1) is held in a high impedance state.

At the time t44, the image forming apparatus 1 turns off the organic EL element E (1, 1) and the sensor driver 45 supplies a charge control signal SCG (1) of a voltage −V1 to the organic EL panel 41. Supplied with the charge control signal SCG (1) of a voltage +V1 at its gate, the transistor T21 (1) of the organic EL panel 41 is turned on. After the transistor T21 (1) is turned on, the potential Vscd (1) of the node SCD (1) is determined by the charge in the capacitor C2 (1). The operational amplifier Op (1) amplifies the potential Vscd (1).

The sensor driver 45 supplies the potential amplified by the operational amplifier Op (1) to the head controller 46 as a sensor output signal OUT (1) at a time from t44 to t45. This sensor output signal OUT (1) serves as a signal corresponding to the emission quantity L (1, 1) of the organic EL element E (1, 1).

The image forming apparatus 1 performs the above operation for all organic EL elements E (1,1) to E (6, 4) in sequence.

The head controller 46 is supplied with the sensor output signal OUT (1) from the sensor driver 45. The head controller 46 stores the supplied sensor output signal OUT (1) in the light quantity storage circuit 71 as the emission quantity L (1, 1) of the organic EL element E (1, 1).

Similarly, the head controller 46 stores the emission quantities L (1, 2) to L (6, 4) of the organic EL elements E (1, 2) to E (6, 4) in the light quantity storage circuit 71 each time it is supplied with the sensor output signal OUT (i) (i=1 to 6) from the sensor driver 45.

Figure 17:
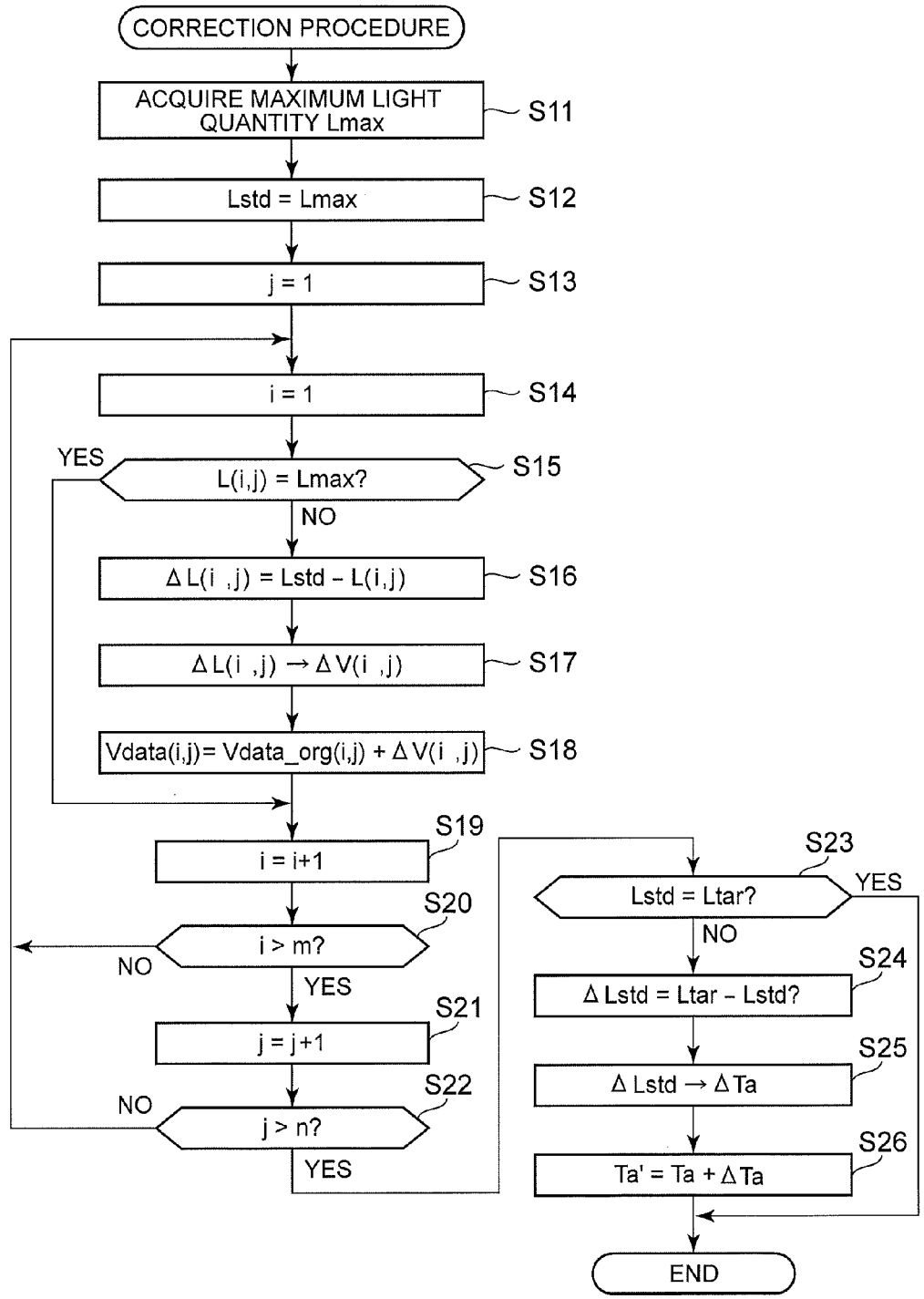
FIG. 17 is a flowchart showing the correction procedure executed by the head controller.

Then, the head controller 46 performs the correction procedure according to the flowchart shown in FIG. 17. Here, described blow, an original gradation signal Vdata_org(i, j) is a value of the original gradation signal Vdata_org correspond to each the emission quantities L (i, j), and a gradation signal Vdata (i, j) is a value of the gradation signal Vdata (1) to Vdata (m) correspond to each the organic EL element E (i, j).

The light quantity comparison circuit 72 of the head controller 46 acquires the maximum light quantity Lmax among the emission quantities L (i, j) (i=1 to m, j=1 to n) stored in the light quantity storage circuit 71 (Step S11).

The light quantity comparison circuit 72 sets the current reference light quantity Lstd to the maximum light quantity Lmax (Step S12). The light quantity comparison circuit 72 stores the reference light quantity Lstd in the light quantity storage circuit 71.

The head controller 46 sets j to 1 (Step S13) and i to 1 (Step S14.)

Then, the light quantity comparison circuit 72 of the head controller 46 determines whether or not the emission quantity L (i, j) is the maximum light quantity Lmax (Step S15).

When it is determined that emission quantity L (i, j) is not the maximum light quantity Lmax (Step S15; No), the light quantity comparison circuit 72 reads the emission quantity L (i, j) and reference light quantity Lstd in the light quantity storage circuit 71, calculates the difference ΔL (i, j) between the emission quantity L (i,j) and reference light quantity Lstd, and supplies it to the correction data calculation circuit 73 (Step S16).

The correction data calculation circuit 73 acquires a gradation signal correction value ΔV (i, j) corresponding to the difference ΔL (i, j) according to the relationship shown in FIG. 10 (Step S17) and supplies the acquired gradation signal correction value ΔV (i, j) to the gradation signal generation circuit 77.

The gradation signal generation circuit 77 corrects the original gradation signal Vdata_org (i, j) by adding the gradation signal correction value ΔV (i, j) to the original gradation signal Vdata_org (i, j) to generate the gradation signal (corrected gradation signal) Vdata (i, j) (Step S18).

When it is determined that the emission quantity L (i, j) is the maximum light quantity Lmax (Step S15; Yes), or after the gradation signal Vdata (i, j) is generated (Step S18), the head controller 46 increments i (Step S19) and determines whether or not i is greater than m (Step S20).

When it is determined that i is not greater than m (Step S20; No), the head controller 46 repeats the Steps S14 through S19.

When it is determined that i is greater than m (Step S20; Yes), the head controller 46 increments j (Step S21) and determines whether or not j is greater than n (Step S22).

When it is determined that j is not greater than n (Step S22; No), the head controller 46 repeats the Steps S14 through S21.

When it is determined that j is greater than n (Step S22; Yes), the head controller 46 determines whether or not the reference light quantity Lstd is equal to the target reference light quantity Ltar (Step S23).

When it is determined that the reference light quantity Lstd is equal to the target reference light quantity Ltar (Step S23; Yes), the head controller 46 ends the correction procedure.

On the other hand, when it is determined that the reference light quantity Lstd is not equal to the target reference light quantity Ltar (Step S23; No), the light quantity comparison circuit 72 acquires the difference ΔLstd between the reference light quantity Lstd and target reference light quantity Ltar (Step S24) and supplies the acquired difference ΔLstd to the anode time calculation circuit 74.

The anode time calculation circuit 74 acquires an anode time correction value ΔTa based on the difference ΔLstd supplied from the light quantity comparison circuit 72 according to the relationship shown in FIG. 11.

The anode time calculation circuit 74 adds the anode time correction value ΔTa to the anode time Ta to acquire a corrected anode time Ta' (Step S26). The anode time calculation circuit 74 stores the acquired corrected anode time Ta' in the anode time storage circuit together with the anode time correction value ΔTa and the head controller 46 ends the correction procedure.

The above correction procedure will be described more specifically hereafter.

Figure 18:
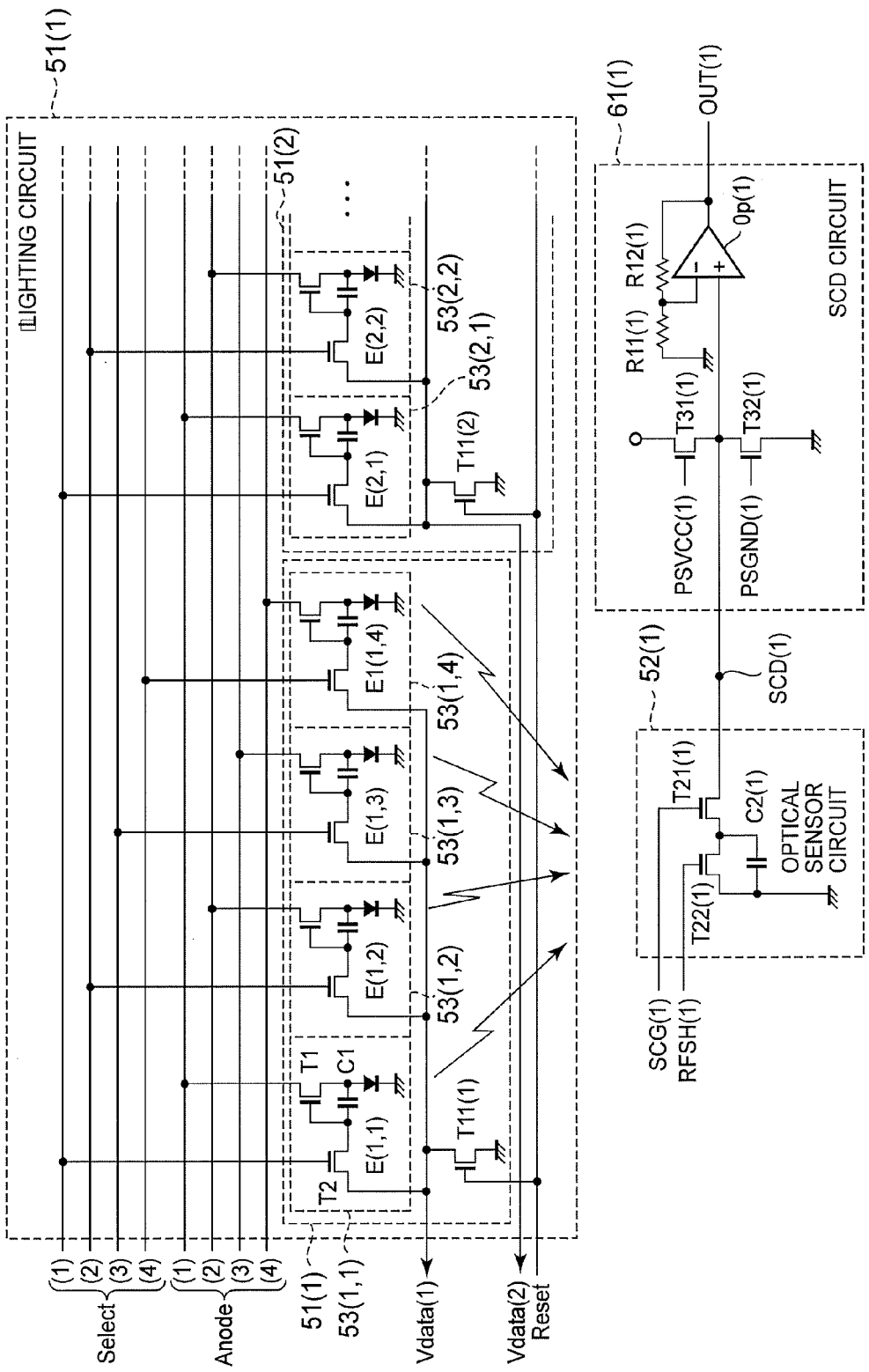
FIG. 18 is an illustration for explaining the behavior of a specific sensor circuit.

Here, it is assumed that i=6 and j=4 as shown in FIG. 18.

Figure 19A:
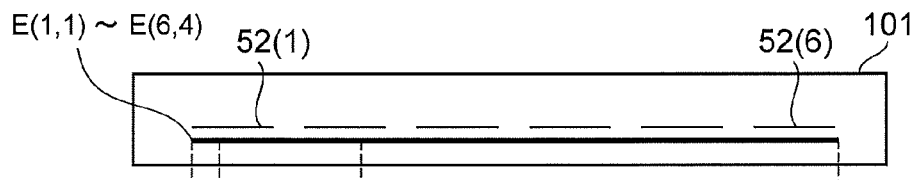
FIGS. 19 A, B, and C are graphical representations for more specifically explaining the correction procedure in the circuit shown in FIG. 18.
Figure 19B:
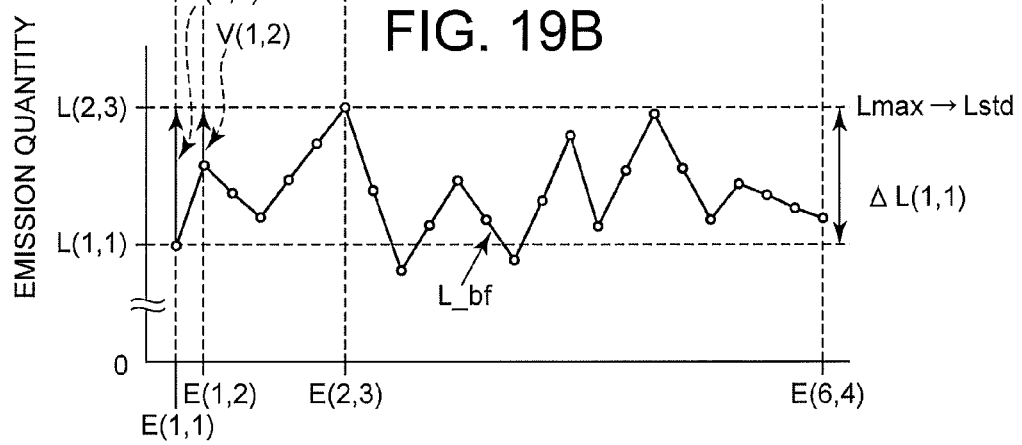

As shown in FIG. 19A, it is further assumed that the emission quantities L (1, 1) to L (6, 4) of the organic EL elements E (1, 1) to E (6, 4) provided on the organic EL panel 101 have an emission quantity distribution L_bf shown in FIG. 19B and the emission quantity L (2, 3) of the organic EL element E (2, 3) is the maximum light quantity Lmax.

The light quantity storage circuit 71 of the head controller 46 stores the emission quantities L (1, 1) to L (6, 4).

The light quantity comparison circuit 72 acquires the emission quantity L (2, 3) of the organic EL element E (2, 3) as the maximum light quantity Lmax among the emission quantities L (1, 1) to L (6, 4) as shown in FIG. 19B. Then, the light quantity comparison circuit 72 sets the reference light quantity Lstd to this maximum light quantity Lmax (the procedure of Steps S11 through S12).

The light quantity comparison circuit 72 reads the emission quantity L (1, 1) from the light quantity storage circuit 71, compares the emission quantity L (1, 1) with the reference light quantity Lstd, and acquires the difference ΔL (1, 1) from the reference light quantity Lstd (the procedure of Steps S16 through S18).

For the emission quantity L (1, 1), the correction data calculation circuit 73 acquires a gradation signal correction value ΔV (1, 1) based on the difference ΔL (1, 1) according to the relationship shown in FIG. 10. Then, the gradation signal correction value ΔV (1, 1) is added to the original gradation signal Vdata_org (1, 1) to generate the gradation signal Vdata (1, 1) (the procedure of Steps S17 through S18).

Figure 19C:
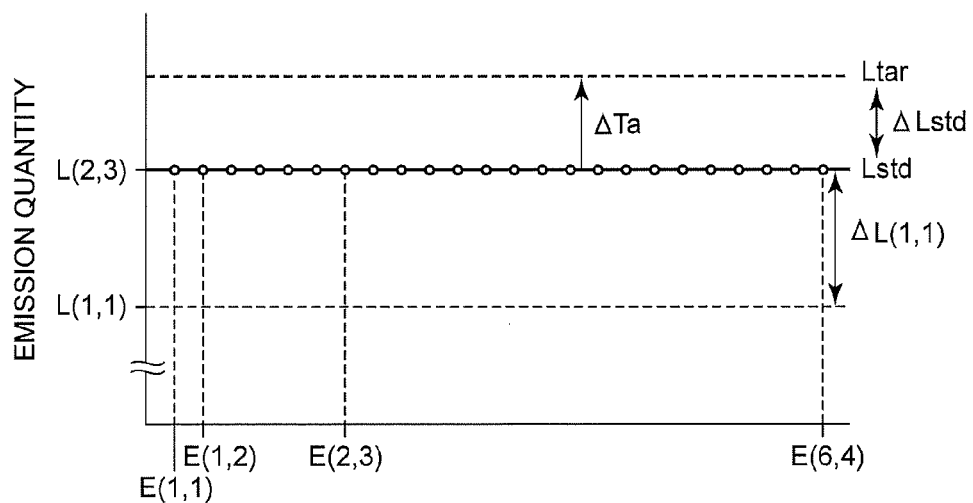

When the organic EL element E (1, 1) emits a quantity of light corresponding to the gradation signal Vdata (1, 1) obtained by correcting the original gradation signal Vdata_org (1, 1), the emission quantity L (1, 1) of the organic EL element E (1, 1) becomes equal to the reference light quantity Lstd as shown in FIG. 19C. Similarly, the emission quantities L (1, 2) to L (6, 4) of the organic EL elements E (1, 2) to E (6, 4) become equal to the reference light quantity Lstd.

As shown in FIG. 19C, the anode time calculation circuit 74 acquires an anode time correction value ΔTa based on the difference ΔLstd between the reference light quantity Lstd and target reference light quantity Ltar according to the relationship shown in FIG. 11 (the procedure of Steps S23 through S26).

The anode time calculation circuit 74 adds the acquired anode time correction value ΔTa to the anode time Ta to acquire a corrected anode time Ta' and stores the new, corrected anode time Ta' in the anode time storage circuit.

Supplied with image data D_image after the correction, the anode time calculation circuit 74 reads the corrected anode time Ta' from the anode time storage circuit and supplies it to the anode driver timing generation circuit 79.

The anode driver timing generation circuit 79 generates a timing signal Stm2 according to the corrected anode time Ta' supplied from the anode time calculation circuit 74.

The head controller 46 supplies the timing signal Stm2 to the anode driver 43, whereby all organic EL elements E (1, 1) emit light in accordance with the corrected gradation signals Vdata (1) to Vdata (6) for the corrected anode time Ta'.

As described above, in this embodiment, the head controller 46 corrects the gradation signals Vdata (i, j) so that the emission quantities L (i, j) of the organic EL elements E (i, j) are equal to the reference light quantity Lstd.

When the current reference light quantity Lstd becomes lower than the target reference light quantity Ltar due to deterioration, the head controller 46 corrects the anode time Ta so that the current reference light quantity Lstd becomes equal to or close to the target reference light quantity Ltar instead of further correcting the gradation signals Vdata (i, j).

Therefore, even if the organic EL elements E (i, j) deteriorate to different degrees, all emission quantities can be equalized and the necessary exposure energy can be ensured by adjusting the anode time. Consequently, even if the emission quantity is reduced due to deterioration with time, the deficiency in light quantity is made up and the printed image quality of the image forming apparatus 1 is ensured.

In this way, the deterioration with time of organic EL elements can be delayed compared with the prior art scheme of controlling only the voltage value of the drive voltage, extending the life of the organic EL elements.

Using organic EL elements E (i, j) for the exposure head 23 in electrophotographic process will contribute to reduced cost.

Using a light source consisting of multiple actively-driven multiple organic EL elements E (i, j) arranged in a row on an organic EL substrate 101 allows the optical sensor circuits 52 (i) to be formed within the organic EL substrate 101 at the same time as the organic EL pixels being formed.

Bonding of wires for driving the organic EL elements E (i, j) can be eliminated, reducing the workload in the production process and cutting down the circuit scale.

Various modifications can be made in realizing the present invention and the present invention is not confined to the above embodiment.

For example, the reference light quantity Lstd is the maximum light quantity Lmax and the anode time Ta is extended based on the difference ΔL (i, j) between the emission quantity L (i, j) and the maximum light quantity Lmax in the above embodiment. However, the reference light quantity Lstd can be, for example, the average value or the minimum value or even the median value instead of the maximum value Lmax.

Here, when the reference light quantity Lstd is the minimum value, the luminance drops compared with the case of using the maximum value Lmax. However, the life of the organic EL elements L (i, j) can be extended.

When the reference light quantity Lstd is the average value or the median value, the luminance can be maintained as much as possible while the life of the organic EL elements E (i, j) is extended.

In the above embodiment, the target reference light quantity Ltar is set to the value of the reference light quantity Lstd based on the emission quantities L (i, j) while the organic EL elements E (i, j) have initial properties. However, the target reference light quantity Ltar can be set to the reference light quantity Lstd upon the previous measurement of luminance.

In the above embodiment, the optical sensor circuits 52 (i) measure the emission quantities of the organic EL elements one at a time. However, the emission quantity of n organic EL elements in one cell 41 (i) simultaneously emitting light can be measured.

In this embodiment, the light emitting elements are organic EL elements. However, the light emitting elements are not restricted to organic EL elements and can be LEDs (light emitting diodes).

Having described and illustrated the principles of this application by reference to one (or more) preferred embodiment(s), it should be apparent that the preferred embodiment may be modified in arrangement and detail without departing from the principles disclosed herein and that it is intended that the application be construed as including all such modifications and variations insofar as they come within the spirit and scope of the subject matter disclosed herein.

What is claimed is:

1. An exposure apparatus irradiating a photoconductor drum with light for exposure, comprising:
   a plurality of light emitting elements which emit light for exposing the photoconductor drum according to image data;
   a light quantity measuring circuit which measures a plurality of emission quantities each of which is based on emission intensity and emission time of one of the plurality of light emitting elements;
   a difference acquisition circuit which acquires a plurality of first differences and a second difference, wherein the difference acquisition circuit sets a reference light quantity based on the plurality of emission quantities when the plurality of light emitting elements are supplied with an original gradation signal having specific values corresponding to the image data and emit light for a predetermined emission time, each of the plurality of first differences is a difference between the reference light quantity and each emission quantity, and the second difference is a difference between a target reference light quantity set corresponding to the image data and the reference light quantity;
   a gradation signal correction circuit generating a plurality of corrected gradation signals by correcting the original gradation signal based on the plurality of first differences so that the plurality of emission quantities of the plurality of light emitting elements in the emission time become close to the reference light quantity; and
   an emission time correction circuit correcting the emission time based on the second difference so that the plurality of emission quantities of the plurality of light emitting elements corresponding to the plurality of corrected gradation signals become close to the target reference light quantity.

2. The exposure apparatus according to claim 1 wherein:
the gradation signal correction circuit comprises:
   a correction value acquisition circuit which acquires a plurality of correction values for each light emitting element to the original gradation signal based on each first difference; and
   a gradation signal generation circuit generating each corrected gradation signal based on each correction value.

3. The exposure apparatus according to claim 1 wherein:
the emission time correction circuit acquires an emission time correction value for correcting the emission time based on the second difference and generates a corrected emission time by the emission time correction value.

4. The exposure apparatus according to claim 3 wherein:
the emission time correction circuit comprises an emission time control circuit which controls the emission time of the plurality of light emitting elements according to the corrected emission time.

5. The exposure apparatus according to claim 1 wherein:
the difference acquisition circuit sets the reference light quantity to any of the maximum light quantity, minimum light quantity, average light quantity, and median light quantity among the plurality of emission quantities.

6. The exposure apparatus according to claim 1 wherein:
the difference acquisition circuit sets the target reference light quantity to the reference light quantity set by the difference acquisition circuit while the plurality of light emitting elements have initial properties or to the reference light quantity set by the difference acquisition circuit upon the previous measurement by the light quantity measuring circuit.

7. The exposure apparatus according to claim 1 wherein:
the plurality of light emitting elements are divided into a plurality of light emitting element groups each including a predetermined number, two or more, of the optical light emitting elements;
the light quantity measuring circuit includes a plurality of light quantity measuring elements corresponding to each light emitting element group, respectively; and
the light quantity measuring elements each have a transistor structure including a semiconductor layer receiving incident light and having a channel width corresponding to the predetermined number of light emitting elements in each light emitting group.

8. The exposure apparatus according to claim 7 wherein:
the plurality of light quantity measuring elements and the plurality of multiple light emitting elements are formed on the same surface of the same substrate in a common production process.

9. The exposure apparatus according to claim 1 wherein:
the light emitting elements are organic EL elements.

10. An image forming apparatus for making prints according to image data, comprising:
   a photoconductor drum that is charged;
   a plurality of light emitting elements which emit light for exposing the photoconductor drum according to the image data;
   a light quantity measuring circuit which measures a plurality of emission quantities each of which is based on emission intensity and emission time of one of the plurality of light emitting element;

a difference acquisition circuit which acquires a plurality of first differences and a second difference, wherein the difference acquisition circuit sets a reference light quantity based on the plurality of emission quantities when the plurality of light emitting elements are supplied with an original gradation signal having specific values corresponding to the image data and emit light for a predetermined emission time, each of the plurality of first differences is a difference between the reference light quantity and each emission quantity, and the second difference is a difference between a target reference light quantity set corresponding to the image data and the reference light quantity;

a gradation signal correction circuit generating a plurality of corrected gradation signals by correcting the original gradation signal based on the plurality of first differences so that the emission quantity of the plurality of light emitting elements in the emission time become close to the reference light quantity; and an emission time correction circuit correcting the emission time based on the second difference so that the plurality of emission quantities of the plurality of light emitting elements corresponding to the plurality of corrected gradation signals become close to the target reference light quantity.

11. The image forming apparatus according to claim 10 wherein:

the difference acquisition circuit sets the reference light quantity to any of the maximum light quantity, minimum light quantity, average light quantity, and median light quantity among the plurality of emission quantities.

12. The image forming apparatus according to claim 10 wherein:

the difference acquisition circuit sets the target reference light quantity to the reference light quantity set by the difference acquisition circuit while the plurality of light emitting elements have initial properties or to the reference light quantity set by the difference acquisition circuit upon the previous measurement by the light quantity measuring circuit.

13. The image forming apparatus according to claim 10 wherein:

the plurality of light emitting elements are divided into a plurality of light emitting element groups each including a predetermined number, two or more, of the optical light emitting elements;

the light quantity measuring circuit includes a plurality of light quantity measuring elements corresponding to each light emitting element group, respectively; and the light quantity measuring elements each have a transistor structure including a semiconductor layer receiving incident light and having a channel width corresponding to the predetermined number of light emitting elements in each light emitting group.

14. The image forming apparatus according to claim 13 wherein:

the plurality of light quantity measuring elements and the plurality of multiple light emitting elements are formed on the same surface of the same substrate in a common production process.

15. The image forming apparatus according to claim 10 wherein:

the light emitting elements are organic EL elements.

16. A method for correcting the emission quantity of an exposure apparatus comprising a plurality of light emitting elements and irradiating a photoconductor drum with light for exposure, comprising the following steps:

measuring a plurality of emission quantities each of which is based on emission intensity and emission time of one of the plurality of light emitting elements when an original gradation signal having specific values corresponding to image data is applied to each of the plurality of light emitting elements;

setting a reference light quantity based on the plurality of measured emission quantities;

acquiring a plurality of first differences each of which is a difference between the set reference light quantity and each emission quantity;

generating a plurality of corrected gradation signals by correcting the original gradation signal based on the plurality of first differences so that the plurality of emission quantities of the plurality of light emitting elements in the emission time become close to the reference light quantity; and setting a target reference light quantity corresponding to the image data and acquiring a second difference that is the difference between the target reference light quantity and the reference light quantity; and correcting the emission time based on the second difference so that the plurality of emission quantities of the plurality of light emitting elements corresponding to the plurality of corrected gradation signals become close to the target reference light quantity.

17. The method for correcting an emission quantity according to claim 16 wherein:

the step of setting the reference light quantity includes a step of setting the reference light quantity to any of the maximum light quantity, minimum light quantity, average light quantity, and median light quantity among the plurality of measured emission quantities.

18. The method for correcting an emission quantity according to claim 16 wherein:

the step of acquiring the second difference includes a step of setting the target reference light quantity to the reference light quantity set in the step of setting the reference light quantity while the plurality of light emitting elements have initial properties or to the reference light quantity set in the previous step of setting the reference light quantity.

* * * * *